(12) United States Patent
Tchoryk et al.

(10) Patent No.: US 9,977,045 B2
(45) Date of Patent: May 22, 2018

(54) ATMOSPHERIC MEASUREMENT SYSTEM

(71) Applicants: Paul Byron Hayes, Ann Arbor, MI (US); Peter Tchoryk, Ann Arbor, MI (US)

(72) Inventors: Peter Tchoryk, Ann Arbor, MI (US); Charles J. Richey, Ann Arbor, MI (US); Paul Byron Hays, Ann Arbor, MI (US); David Keith Johnson, Ann Arbor, MI (US); David Michael Zuk, Ann Arbor, MI (US)

(73) Assignee: Michigan Aerospace Cororation, Ann Arbor, MI (US)

( * ) Notice: Subject to any disclaimer, the term of this patent is extended or adjusted under 35 U.S.C. 154(b) by 496 days.

(21) Appl. No.: 14/434,794

(22) PCT Filed: Oct. 11, 2013

(86) PCT No.: PCT/US2013/064693
§ 371 (c)(1),
(2) Date: Apr. 10, 2015

(87) PCT Pub. No.: WO2014/084973
PCT Pub. Date: Jun. 5, 2014

(65) Prior Publication Data
US 2015/0233962 A1  Aug. 20, 2015

Related U.S. Application Data

(60) Provisional application No. 61/732,210, filed on Nov. 30, 2012.

(51) Int. Cl.
*G01P 5/26* (2006.01)
*G01S 17/58* (2006.01)
(Continued)

(52) U.S. Cl.
CPC .............. *G01P 5/26* (2013.01); *G01S 7/4808* (2013.01); *G01S 7/4814* (2013.01);
(Continued)

(58) Field of Classification Search
CPC . G01P 5/001; G01P 3/36; G01S 17/58; G01S 17/95; G01W 1/00
See application file for complete search history.

(56) References Cited

U.S. PATENT DOCUMENTS

| 2006/0140764 A1 | 6/2006 | Smith et al. |
| 2008/0001409 A1 | 1/2008 | Schellings |

(Continued)

FOREIGN PATENT DOCUMENTS

WO  WO 2011/076295 A2  6/2011

OTHER PUBLICATIONS

International Search Report in corresponding PCT application PCT/US2013/064693 dated Jan. 22, 2014, 3 pp.
(Continued)

*Primary Examiner* — Luke D Ratcliffe
(74) *Attorney, Agent, or Firm* — Juan Carlos A. Marquez; Marquez IP Law Office, PLLC

(57) ABSTRACT

An apparatus providing for simultaneous measurement of the wind upstream and downstream of a wind turbine uses either a single LIDAR beam split into two beams, each focused upstream or downstream of the windmill, or a multiple beam LIDAR with a first beam source aimed toward the upstream direction of the wind and a second beam source aimed at the downstream direction after the wind has passed through the wind turbine. The apparatus may also use LIDAR to measure wind direction and speed by making measurements along slightly different lines of sight, or by pointing the LIDAR in different directions. Two lines of sight allow measuring wind direction in the plane
(Continued)

defined by the two lines of sight. Three non-coplanar lines of sight provide the information necessary to determine a full 3-dimensional wind velocity vector. Further, LIDAR may also be used to measure wind speed by estimating the wind velocity using inputs from both aerosol and molecular components.

7 Claims, 21 Drawing Sheets

(51) Int. Cl.
    *G01S 17/87*     (2006.01)
    *G01S 17/95*     (2006.01)
    *G01S 7/48*     (2006.01)
    *G01S 7/481*     (2006.01)
    *G01S 7/491*     (2006.01)

(52) U.S. Cl.
    CPC .......... *G01S 7/4816* (2013.01); *G01S 7/4818* (2013.01); *G01S 7/4917* (2013.01); *G01S 17/58* (2013.01); *G01S 17/87* (2013.01); *G01S 17/95* (2013.01)

(56) References Cited

U.S. PATENT DOCUMENTS

| 2011/0149268 A1* | 6/2011 | Marchant | G01P 5/001 356/27 |
| 2011/0188029 A1* | 8/2011 | Schmitt | G01S 17/95 356/28 |
| 2011/0196568 A1* | 8/2011 | Nickolaou | B60W 30/0953 701/31.4 |
| 2012/0169053 A1 | 7/2012 | Tchoryk et al. | |
| 2012/0179376 A1 | 7/2012 | O'Brien et al. | |

OTHER PUBLICATIONS

International Preliminary Report on Patentability and Written Opinion in corresponding PCT application PCT/US2013/064693 dated Jun. 11, 2015, 6 pp.

* cited by examiner

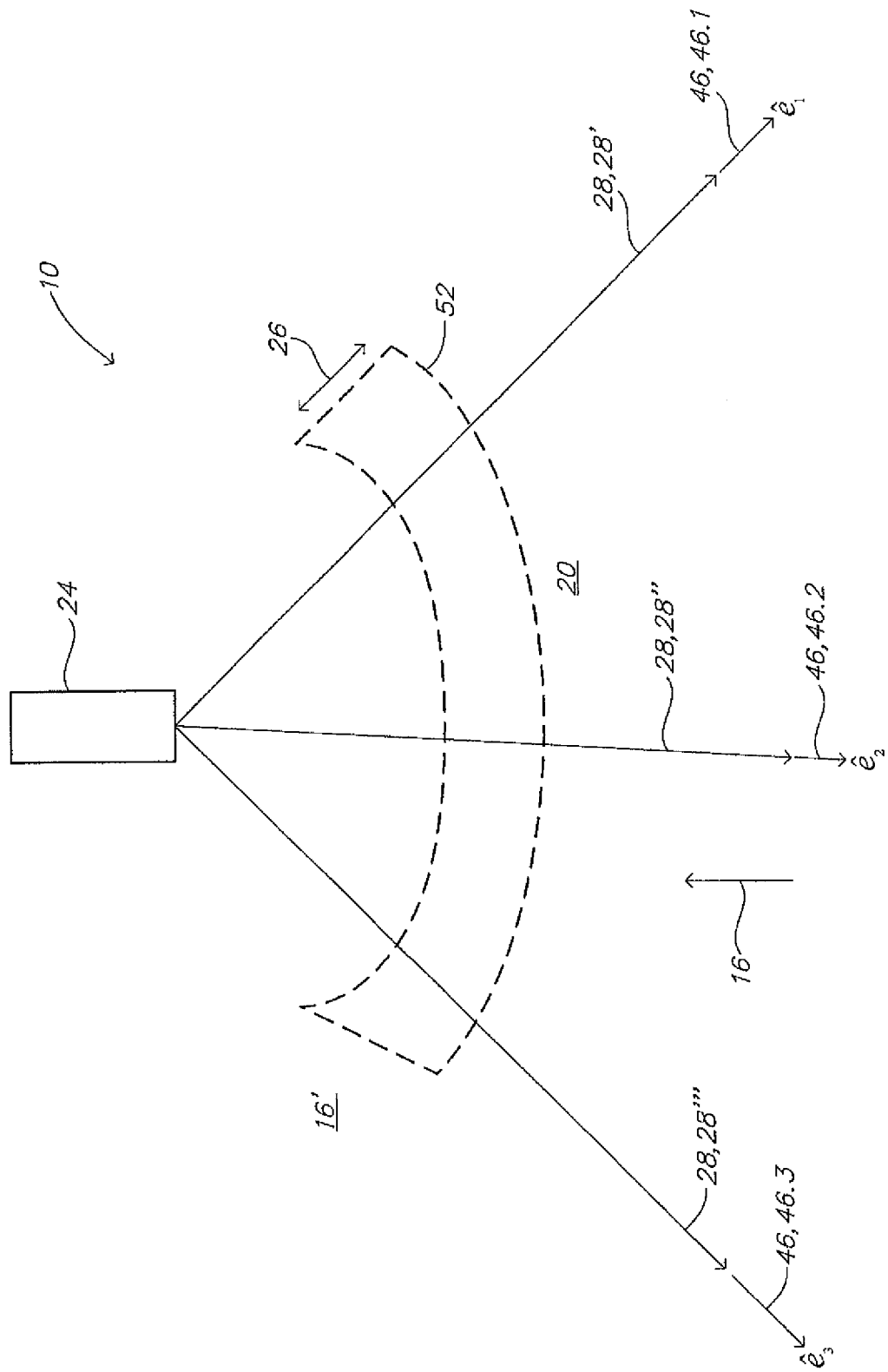

ATMOSPHERIC MEASUREMENT SYSTEM

CROSS-REFERENCE TO RELATED APPLICATIONS

This application claims the benefit of U.S. Provisional Application No. 61/732,210, filed on Nov. 30, 2012; and is the U.S. National Stage of PCT Application No. PCT/US2013/064693, filed Oct. 11, 2013, which is a continuation-in-part application of U.S. National Stage application Ser. No. 13/387,553, and claims priority thereto. U.S. National Stage application Ser. No. 13/387,553 claims priority from PCT/US2010/043801 filed Jul. 29, 2010, which claims the priority of U.S. Provisional Patent Application Ser. No. 61/229,608, filed on Jul. 29, 2009, U.S. Provisional Patent Application Ser. No. 61/266,916, filed on Dec. 4, 2009, and U.S. Provisional Patent Application Ser. No. 61/290,004, filed on Dec. 24, 2009. The entire content of each of the above-identified applications is incorporated herein by reference.

BACKGROUND OF THE INVENTION

The present invention is generally directed to Light Detection And Ranging (LIDAR) systems adapted to measure air data products on a variety of platforms, for example, including, but not limited to, satellites, aircraft, UAVs, glide weapon systems, ground-based platforms (stationary or mobile), and watercraft. Such LIDAR systems can be adapted to measure air data products of a variety of atmospheres, for example, that of the Earth or other planetary or celestial bodies, or can be adapted to measure or map air data products of fields within a wind tunnel or surrounding an aerodynamic body during the operation thereof. Furthermore, although one embodiment uses ultraviolet (UV) laser light, LIDAR systems can operate over a large range of wavelengths spanning from ultraviolet to infrared. The shorter wavelength ultraviolet light provides additional stealth characteristics for the system because the light is quickly absorbed by the atmosphere, and is not otherwise easily detected from relatively long-range distances. However, LIDAR systems can also operate in other wavelength regions, such as longer ultraviolet wavelengths or even visible wavelengths.

LIDAR systems in accordance with any of the above-described aspects can be used for any optical remote sensing scenario to provide atmospheric data, to characterize the atmosphere or to detect flow within the atmosphere. For example, LIDAR systems could be applied to the detection of Clear Air Turbulence, Optical Air Data systems, Atmospheric Aerosol Characterization, Smog detection and Chemical/Biological Agent detection. LIDAR systems can be used to provide air data for Field Artillery Fire Direction Control, Small Arms Wind correction, Airport Turbulence Monitoring and Ship Navigation velocity/weather monitoring. LIDAR systems can also be used to provide air data for predicting winds for any sporting events in which microscale airflow plays a significant role such as golf, football, baseball, etc. LIDAR systems can also be used to provide air data for Wind Farm Site Assessment, Wind Farm Monitoring, and Wind Turbine control.

Even more, LIDAR systems can be used to detect any object from which the beam of light would scatter, or to detect the flow of any medium through which the associated beam of light will propagate and from which the beam of light will scatter. For example, depending upon the wavelength of the light source 11, LIDAR systems could be used to detect the flow of other gases; or liquids, for example, water or liquid chemicals or solutions.

SUMMARY OF THE INVENTION

In at least one embodiment, the present invention relates to an apparatus that provides for simultaneous measurement of the wind upstream and downstream of a wind turbine using LIDAR, with the wind turbulence downstream of the turbine and its effect on other turbines of primary focus in this invention. A single LIDAR beam could be split to operate in more than one direction, with multiple beams focused upstream and downstream of the windmill as a desired embodiment. Applicants have found that a wind turbine wake is of interest as wakes have been shown to extend to and impact the performance of other wind turbines in the wind farms.

In the case of a multiple beam LIDAR, one possible embodiment would use a single laser beam that is split into two beams where one beam is looking in the opposite direction of the first beam. In the case where the first beam is aimed toward the upstream direction of the wind, the second beam would be aimed at the downstream direction of the wind after the wind has passed through the wind turbine. Measurements would be made in at least one range bin for each line of sight, but two or more range bins for each line of sight is not only feasible, but in most cases desired.

In at least a second embodiment, the present invention relates to an apparatus that uses LIDAR to measure wind direction and speed by making measurements along slightly different lines of sight, or by pointing the LIDAR in different directions. Two lines of sight allow one to measure wind direction in the plane defined by the two lines of sight. Three non-coplanar lines of sight would provide the information necessary to determine a full 3-dimensional wind velocity vector.

In a further embodiment, the present invention also relates to an apparatus that uses LIDAR to measure wind speed by estimating the wind velocity using inputs from both aerosol and molecular components. Measurement precision is said to be improved when the aerosol and molecular components have nearly the same velocity. When to or not to combine the aerosol and molecular components into a single measurement can be decided statistically. The threshold for deciding when to combine the measurements would be based on what the system designer establishes as a reasonable and safe operating scenario. Establishing a threshold for combining or separating measurements, will depend upon the characteristics of the wind turbine and how the data is being used to control or monitor the wind turbine.

BRIEF DESCRIPTION OF THE DRAWINGS

The invention will now be described more particularly with reference to the accompanying drawings which show, by way of example only, one embodiment of wave powered prime mover according to the invention, wherein;

FIG. 2a illustrates a top view of the wind farm and associated atmospheric measurement system illustrated in FIG. 1a;

FIG. 3 illustrates a LIDAR sensor an atmospheric measurement system, and an associated measurement volume;

FIG. 10a illustrates an embodiment of an associated detection system of a range imaging LIDAR system;

FIG. 10b illustrates a plan view of a digital micro mirror device (DVD) used in the embodiments illustrated in FIG. 9a.

DETAILED DESCRIPTION OF THE PREFERRED EMBODIMENTS

Figure 1A:
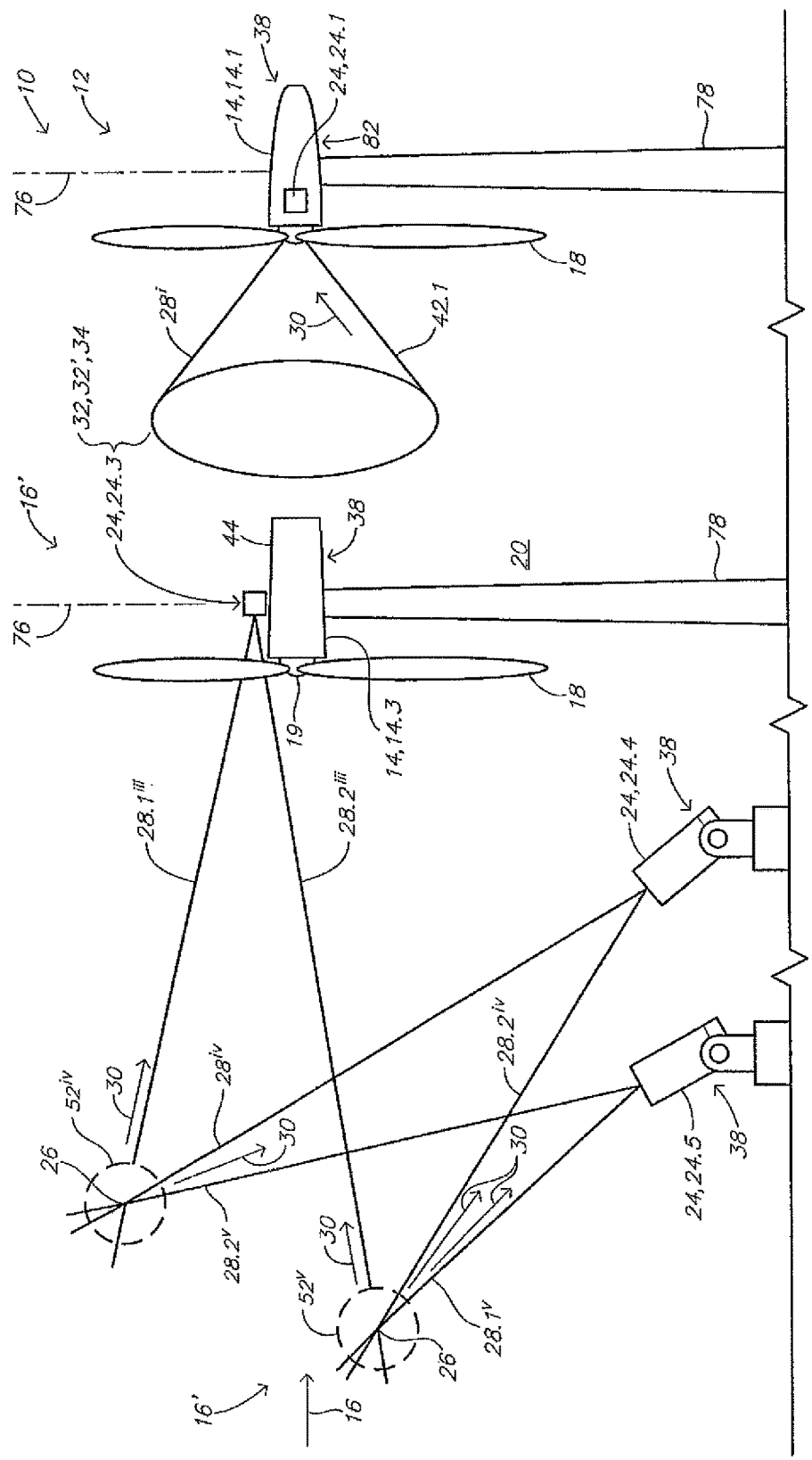
FIG. 1a to illustrates a side view of a wind farm in association with an atmospheric measurement system according to a general embodiment of the invention.
Figure 2A:
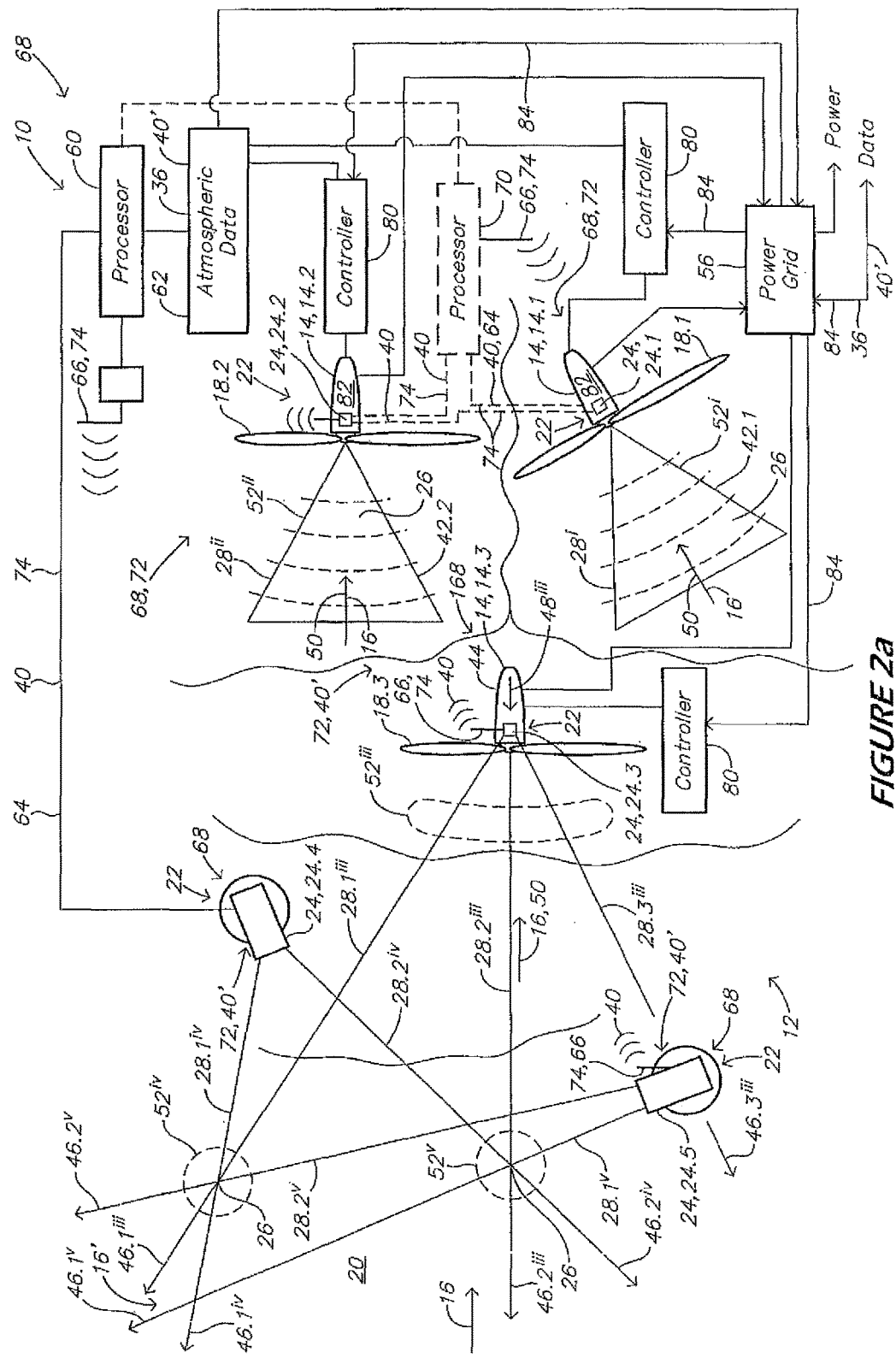

In a general embodiment of the present invention, with reference to FIGS. 1a and 2a, an atmospheric measurement system 10 is illustrated in association with a wind farm 12 comprising a plurality of wind turbines 14 that are used to generate power, e.g. electrical power, from the wind 16.

The atmospheric measurement system 10 provides for generating a measure of wind power flux density $\bar{\psi}$ over the geographic area of the wind farm 12, which can be used to predict an upper bound on power generating capability of each of the wind turbines 14 thereof, and which can accordingly be used for controlling the wind turbines 14 responsive thereto. More particularly, the atmospheric measurement system 10 comprises a network 22 of LIDAR sensors 24, each of which provide for remotely sensing atmospheric data including wind speed v and atmospheric density ρ at one or more different range bins 26 along one or more associated beams of light 28 projected into the atmosphere 20, from scattered light 30 scattered by the atmosphere 20 from within the range bins 26 and received by associated receive optics 32, e.g. one or more telescopes 32', of each LIDAR sensor 24 that cooperate with one or more associated detection systems 34 (see for example FIG. 5a). The beams of light 28 projected by the atmospheric measuring system 10 may be implemented using ultraviolet (UV) laser light, as an example. However, LIDAR systems can operate over a large range of wavelengths spanning from ultraviolet to infrared. The shorter wavelength ultraviolet light provides additional stealth characteristics for the system because the light is quickly absorbed by the atmosphere, and is not otherwise easily detected from relatively long-range distances. However, LIDAR systems can also operate in other wavelength regions, such as longer ultraviolet wavelengths or even visible wavelengths. Correspondingly, the beams of light 28 may be implemented using energy in such a variety of wavelengths ranging from the shorter ultraviolet wavelengths to the longer ultraviolet wavelengths, the infrared wavelengths to the visible wavelengths, as would be understood by those of skill in the art. Even more, in embodiments where multiple sources of light are used, as will be discussed hereinbelow, different beams of light 28 or different energy sources may be implemented in different wavelengths from one another. For example, one source for a beam of light may be an ultraviolet source, while another source in the same system may be an infrared source. The selection of the source(s) for use within one system or implementation would be understood by those of skill in the art given the needs, requirements and advantages of each embodiment of the invention described herein.

For example, each LIDAR sensor 24 may be constructed and operated in accordance with the teachings of any of the following: U.S. patent application Ser. No. 11/460,603 filed on 27 Jul. 2006 that issued as U.S. Pat. No. 7,495,774 on 24 Feb. 2009, entitled Optical Air Data System; International Application Serial No. PCT/US10/31965 filed on 21 Apr. 2010, entitled Atmospheric Measurement System; U.S. application Ser. No. 12/780,895 filed on 15 May 2010, entitled Range Imaging LIDAR U.S. Provisional Patent Application Ser. No. 61/266,916, filed on Dec. 4, 2009, entitled Direct Detection LIDAR; and U.S. Provisional Patent Application Ser. No. 61/290,004, filed on Dec. 24, 2009, entitled LIDAR Signal Processing System and Method, all of which above-identified patents and patent applications are incorporated herein by reference in their entirety.

For each beam of light 28, and within each associated range bin 26 thereof, the associated LIDAR sensor 24 provides for measuring corresponding atmospheric data 36, including a component of wind speed v in a direction along the beam of light 28 responsive to a Doppler shift in the frequency of the scattered light 30 by either or both molecular or aerosol components of the atmosphere 20, and including associated atmospheric data scalars of atmospheric temperature T, atmospheric density ρ, molecular counts $N_M$, aerosol counts $N_A$ and background counts $N_B$ at a given sampling times, wherein the particular sampling times $t_i$ are also measured, for example, using an associated GPS receiver 38 that provides a corresponding universal time reference, so as to provide for accounting for the dynamic behavior of the associated atmospheric data. Accordingly, in an atmospheric measurement system 10 adapted to generate a measure of wind power flux density $\bar{\psi}$ over a geographic area, each associated LIDAR sensor 24 provides for generating an atmospheric measurement record 40 for each range bin 26 at each sampling time $t_i$ that includes at least an identification or nominal location of the associated range bin 26, the extent, e.g. length, of the range bin 26, the sampling time $t_i$, the magnitude and direction of the component of wind speed v in the direction along the beam of light 28, the local density ρ of the atmosphere 20. The atmospheric measuring record may also include measurements of the other atmospheric data scalars identified herein, including temperature and water vapor.

In the example of the atmospheric measurement system 10 and wind farm 12 illustrated in FIGS. 1a and 2a, two of the wind turbines 14.1, 14.2 are illustrated with associated LIDAR sensors 24.1, 24.2 incorporating corresponding beams of light $28^i$, $28^{ii}$ that emanate from a central region of the rotors 18 of the associated wind turbines 14.1, 14.2—for example, from the hubs 19 thereof—and that rotate therewith so that the respective associated beams of light 28 sweep out corresponding conical surfaces of revolution 42.1, 42.2, wherein different wind turbines 14.1, 14.2 are illustrated pointing in different directions, for example, responsive to spatial variations of the associated wind field 16', with the associated conical surfaces of revolution 42.1, 42.2 aligned with the associated rotors 18.1, 18.2 pointing in the corresponding different directions. The LIDAR sensor 24 can also be decoupled from the hub, providing fixed beams of light 28 pointing in different directions. Anywhere from one to six beams of light 28 would be typical. In one embodiment, a single beam of light 28 is aligned with the axis of rotation of the wind turbine. The beam of light 28 can be either aligned with and along the axis of rotation or transversely offset relative thereto. A third wind turbine 14.3 is illustrated with an associated LIDAR sensor 24.3 relatively fixed to the nacelle 44 thereof and incorporating three associated fixed beams of light $28.1^{iii}$, $28.2^{iii}$, $28.3^{iii}$ directed in three corresponding different directions $46.1^{iii}$, $46.2^{iii}$, $46.3^{iii}$, wherein the beams of light $28.1^{iii}$, $28.2^{iii}$, $28.3^{iii}$ along the associated directions $46.1^{iii}$, $46.2^{iii}$, $46.3^{iii}$ turn with the nacelle 44 as the direction $48^{iii}$ of the nacelle 44 is changed to accommodate changes in the local direction 50 of the wind 16. The atmospheric measurement system 10 is also illustrated with additional LIDAR sensors 24.4, 24.5 that are separate from the wind farm 12, for example, upstream thereof in the associated wind field 16' so as to provide associated atmospheric data 36 of wind 16 in advance of the interaction thereof with the wind turbines 14.1, 14.2, 14.3 located downstream thereof. For example, a fourth LIDAR sensor 24.4 is illustrated incorporating two associated beams of light $28.1^{iv}$, $28.2^{iv}$ in two corresponding different directions $46.1^{iv}$, $46.2^{iv}$, and a fifth LIDAR sensor 24.5 is illustrated also incorporating two associated beams of light $28.1^v$, $28.2^v$ in two corresponding different directions $46.1^v$, $46.2^v$.

Generally, the determination of wind direction and the total magnitude of wind speed v require at least three measures of associated wind speed v in three linearly independent directions. This can be provided either by a single LIDAR sensor 24 with an associated beam or beams of light 28 and associated receive optics 32 looking in at least three linearly independent directions, or a plurality of different LIDAR sensors 24 that collectively incorporate associated beams of light 28 and associated receive optics 32 collectively looking in at least three linearly independent directions, such that the wind field 16' being measured by the LIDAR sensor or sensors 24 is assumed to be relatively uniform for each group of separate associated measurements, for example, each group of three measurements in three associated linearly independent directions.

For example, in accordance with a first aspect, referring to FIGS. 1a, 2a and 3, for a single LIDAR sensor 24 with either a single beam of light 28 projected into the atmosphere 20 at three different times in three different linearly independent directions 46, or three separate beams of light 28', 28", 28''' projected into the atmosphere 20 substantially simultaneously in three different linearly independent directions 46.1, 46.2, 46.3, the resulting three measurements of wind speed v for the associated range bin 26 can be combined to provide a vector measure of wind velocity $\bar{v}$ for the associated measurement volume 52 if the wind field 16' is relatively uniform within measurement volume 52 during the period of time over which the associated measurements are made with the LIDAR sensor 24. For example, the first aspect illustrated in FIG. 3 is representative of the measurement volumes $52^i$, $52^{ii}$, $52^{iii}$ associated with the first 24.1, second 24.2 and third 24.3 LIDAR sensors illustrated in FIGS. 1a and 2a, wherein for the first 24.1 and second 24.2 LIDAR sensors the three separate beams of light 28', 28", 28''' illustrated in FIG. 3 correspond to the respective single beams of light $28^i$, $28^{ii}$ illustrated in FIGS. 1a and 2a at three distinct points in time corresponding to three distinct rotational angles of the corresponding rotors 18 of the corresponding wind turbines 14.1, 14.2; and for the third LIDAR sensor 24.3, the three separate beams of light 28', 28", 28''' illustrated in FIG. 3 correspond to the respective associated three separate beams of light $28.1^{iii}$, $28.2^{iii}$, $28.3^{iii}$ illustrated in FIGS. 1a and 2a at a substantially common point in time. The resolution and accuracy of the resulting measure of wind velocity $\bar{v}$ will depend upon the relative separation and independence of the associated directions 46.1, 46.2, 46.3 of the beams of light 28', 28", 28''' from which the measurement is derived. For example, to be independent, the three beams of light 28', 28", 28''' cannot all lie in the same plane. The resulting measure of wind velocity $\bar{v}$ is improved with increasing mutual angles of separation of the associated beams of light 28', 28", 28'''. The resolution and accuracy of the resulting measure of wind velocity $\bar{v}$ will also depend upon the variation of actual wind velocity $\bar{v}$ within the measurement volume 52 during the associated measurement interval. For example, for the first 24.1 and second 24.2 LIDAR sensors, this is dependent both upon the spatial extent of the associated conical surfaces of revolution 42.1, 42.2, and the temporal extent between the first and last rotational positions of the associated rotors 18 and associated respective beams of light $28^i$, $28^{ii}$ associated with the corresponding beams of light 28', 28", 28''' for which the measurements of wind speed v are made, and upon the associated change in wind velocity $\bar{v}$ over both these associated spatial and temporal extents.

With three separate beams of light 28', 28", 28''' emanating from a common LIDAR sensor 24, the spatial extent of the measurement volume 52 and the associated separation between wind speed v measurements grows with range from the LIDAR sensor 24, thereby increasing the prospects for variation in associated actual wind velocity $\bar{v}$ within the measurement volume 52 with increasing range, which could thereby reduce the accuracy of a resulting associated measurement of wind velocity $\bar{v}$ from the associated wind speed v measurements. For example, it is not uncommon to have a substantial variation of actual wind speed v between the top and bottom of the path of the associated rotor 18 during the rotation thereof.

Figure 4:
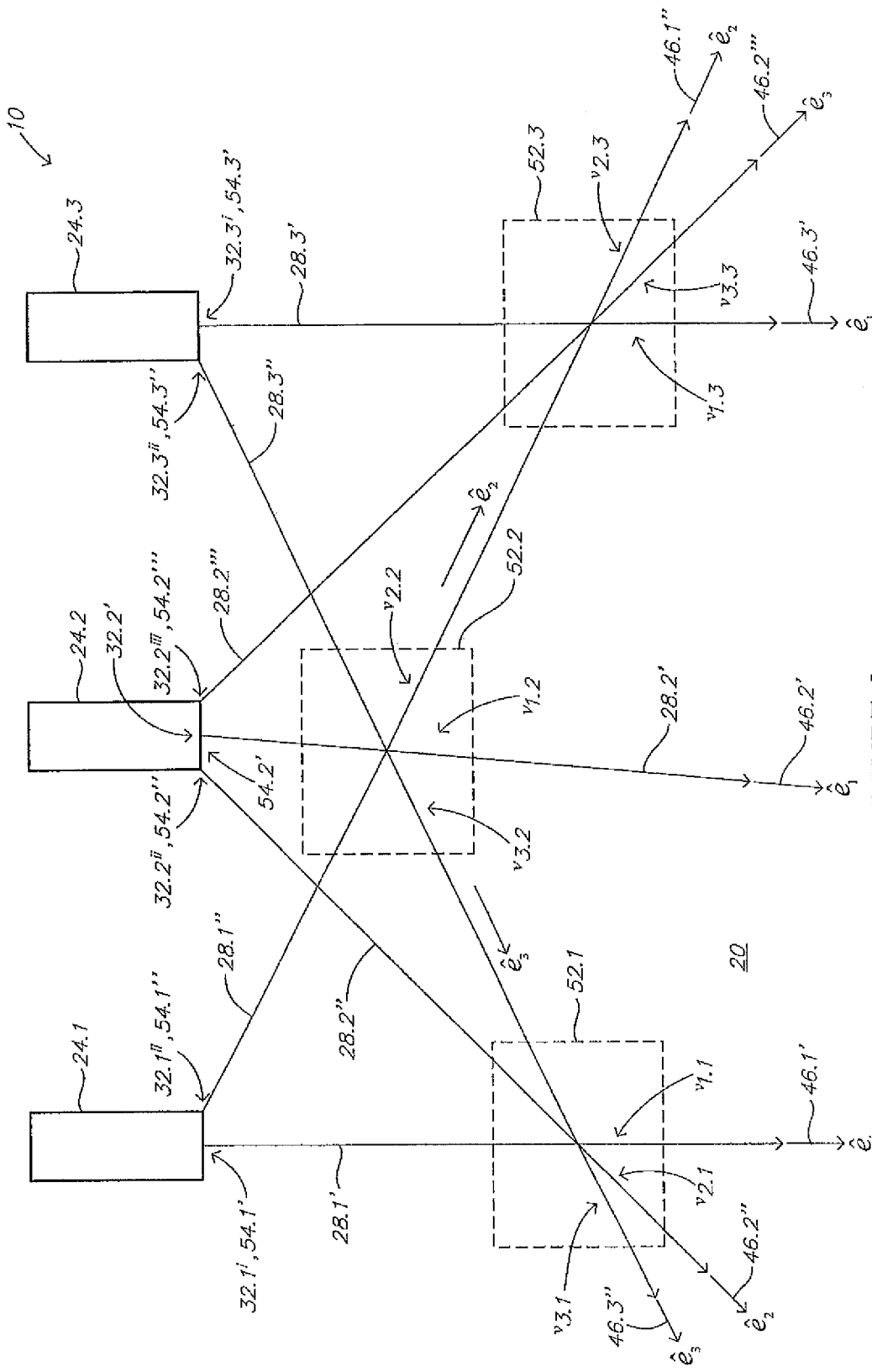
FIG. 4 illustrates a plurality of LIDAR sensors an atmospheric measurement system and a plurality of associated measurement volumes in common therewith.

In accordance with a second aspect, referring to FIGS. 1a, 2a and 4, the LIDAR sensors 24 may be used in cooperation with one another so as to provide for a plurality of different beams of light 28', 28", 28''' in different directions from different LIDAR sensors 24.1, 24.2, 24.3 directed through a common measurement volume 52, and with associated receive optics 32 of the different LIDAR sensors 24.1, 24.2, 24.3 having associated different fields of view 54.1, 54.2, 54.3 (with different superscripts ', " and ''' associated with different beams of light 28', 28", 28''' from each of the LIDAR sensors 24.1, 24.2, 24.3) that each intersect one another within the common measurement volume 52 so as to receive scattered light 30 therefrom, and thereby collectively provide for generating three different corresponding measures of wind speed $v_1$, $v_2$, $v_3$ from three different associated directions 46.1, 46.2, 46.3 for the common measurement volume 52, from which an associated wind velocity $\bar{v}$ can be determined that is substantially unaffected by either spatial or temporal variations in actual wind velocity $\bar{v}$ if the measures of wind speed $v_1$, $v_2$, $v_3$ are sufficiently simultaneous relative to any temporal variation of the wind field 16' within the measurement volume 52. The size of the common measurement volume 52, and therefore the spatial resolution of the resulting measurement of wind velocity $\bar{v}$, depends upon the extent to which the different beams of light 28', 28", 28''' and the associated different fields of view 54.1, 54.2, 54.3 of the associated receive optics 32 intersect one another, and the relative angles thereof, within the common measurement volume 52.

To the extent that the different beams of light 28', 28", 28''' or the associated different fields of view 54.1, 54.2, 54.3 of the associated receive optics 32 do not all intersect one another within the common measurement volume 52, or to the extent that all of the associated measures of wind speed $v_1$, $v_2$, $v_3$ are not generated simultaneously, then the accuracy of the resulting measure of wind velocity $\bar{v}$ as determined from the measures of wind speed $v_1$, $v_2$, $v_3$ will be affected by both the spatial and temporal variation of actual wind velocity $\bar{v}$ from an assumed uniform common actual wind $\bar{v}$ that is otherwise assumed to be associated with the measures of wind speed $v_1$, $v_2$, $v_3$.

Referring in particular to FIG. 4, there is illustrated a group of three LIDAR sensors 24.1, 24.2, 24.3 in cooperation with one another so as to provide for generating three different measures of wind $\bar{v}_1$, $\bar{v}_2$, $\bar{v}_3$ from three corresponding different measurement volumes 52.1, 52.2, 52.3, substantially independent of spatial and temporal variations of the associated wind field 16'. More particularly, each of the LIDAR sensors 24.1, 24.2, 24.3 respectively projects a corresponding respective first beam of light 28.1', 28.2', 28.3' into the respective corresponding measurement volume 52.1, 52.2, 52.3 substantially in front of the each corresponding respective LIDAR sensor 24.1, 24.2, 24.3, and each LIDAR sensor 24.1, 24.2, 24.3 incorporates a corresponding first set of receive optics 32.1', 32.2', 32.3' having associated fields of view 54.1', 54.2', 54.3' that intersect the respective corresponding first beams of light 28.1', 28.2', 28.3' within the respective corresponding measurement volumes 52.1, 52.2, 52.3 so as to provide for measuring respective corresponding first components of wind speed $v_{1.1}$, $v_{1.2}$, $v_{1.3}$ therewithin along respective corresponding first directions 46.1', 46.2', 46.3'. The first LIDAR sensor 24.1 also projects a second beam of light 28.1" through the second 52.2 and third 52.3 measurement volumes, and incorporates a second set of receive optics 32.1" having associated fields of view 54.1" that intersect the second beam of light 28.1" within the second 52.2 and third 52.3 measurement volumes so as to provide for measuring respective corresponding second components of wind speed $v_{2.2}$, $v_{2.3}$ therewithin along a corresponding second direction 46.1". The second LIDAR sensor 24.2 also projects a second beam of light 28.2" through the first measurement volume 52.1 and incorporates a second set of receive optics 32.2" having an associated field of view 54.2" that intersects the second beam of light 28.2" within the first measurement volume 52.1 so as to provide for measuring a corresponding second component of wind speed $v_{2.1}$ therewithin along a corresponding second direction 46.2". Furthermore, the second LIDAR sensor 24.2 also projects a third beam of light 28.2''' through the third measurement volume 52.3, and incorporates a third set of receive optics 32.2''' having an associated field of view 54.2''' that intersects the third beam of light 28.2''' within the third measurement volume 52.3 so as to provide for measuring a corresponding third component of wind speed $v_{3.3}$ therewithin along a corresponding third direction 46.2'''. The third LIDAR sensor 24.3 also projects a second beam of light 28.3" through the second 52.2 and first 52.1 measurement volumes, and incorporates a second set of receive optics 32.3" having associated fields of view 54.3" that intersect the second beam of light 28.3" within the second 52.2 and first 52.1 measurement volumes so as to provide for measuring respective corresponding third components of wind speed $v_{3.2}$, $v_{3.1}$ therewithin along a corresponding second direction 46.3". The associated beams of light 28.1', 28.2", 28.2', 28.2", 28.3''', 28.3', 28.3" are configured so that the associated directions 46.1', 46.2" and 46.3" are linearly independent (i.e. not all in the same plane) within the first measurement volume 52.1, the associated directions 46.2', 46.1" and 46.3" are linearly independent (i.e. not all in the same plane) within the second measurement volume 52.2, and the associated directions 46.3', 46.1" and 46.2' are linearly independent (i.e. not all in the same plane) within the third measurement volume 52.3, so as to provide for determining a first measure of wind velocity $\bar{v}_1$ from the first $v_{1.1}$, second $v_{2.1}$ and third $v_{3.1}$ components of wind speed within the first measurement volume 52.1, determining a second measure of wind $\bar{v}$, from the first $v_{1.2}$, second $v_{2.2}$ and third $v_{3.2}$ components of wind speed within the second measurement volume 52.2, and determining a third measure of wind velocity from the first $v_{1.3}$, second $v_{2.3}$ and third $v_{3.3}$ components of wind speed within the third measurement volume 52.3. For example, the second aspect illustrated in FIG. 4 is representative of the measurement volumes $52^{iv}$, $52^{v}$ associated with the third 24.3, fourth 24.4 and fifth 24.5 LIDAR sensors illustrated in FIGS. 1a and 2a.

Generally, each LIDAR sensor 24 may provide for one or more beams of light 28 and associated fields of view 54, and any number of distinct beams of light 28 and associated fields of view 54 from different LIDAR sensors 24 may be associated with each measurement volume 52. The configurations illustrated in FIGS. 1a, 2a, 3 and 4 are not intended to be limiting. For example, the a particular LIDAR sensors 24.3, 24.4, 24.5 illustrated in FIGS. 1a and 2a, or the LIDAR sensors 24.1, 24.2, 24.3 illustrated in FIG. 4, with associated distinct beams of light 28 could each incorporated more than three distinct fields of view 54, for example, using the same number of fixed beams of light 28 or a fewer number of beams of light 28 whose position or direction is varied over time. Furthermore, there could be more than three associated fields of view 54 associated with any of the associated measurement volumes $52^{iii}$, $52^{iv}$, $52^v$, 52.1, 52.2, 52.3. As a further example, for either the first 14.1 or second 14.2 wind turbine illustrated in FIGS. 1a and 2a, the beams of light 28 associated therewith could be adapted to sweep out a plurality of conical surfaces of revolution 42, or a more general pattern, by varying the angle of the beam of light 28 relative to the axis of rotation 55 of the associated wind turbine 14. Furthermore, the associated LIDAR sensors 24 of the atmospheric measurement system 10 may incorporate, or be incorporated in, a variety of platforms, including, but not limited to fixed, portable, or mobile platforms, the latter of which include land vehicles, aircraft, balloons and satellites, wherein for each platform, the associated one or more beams of light 28 of the associated LIDAR sensor 24 may be either fixed or positionable relative to the associated platform, the latter of which includes either positioning at discrete orientations or continuous scanning.

Figure 1B:
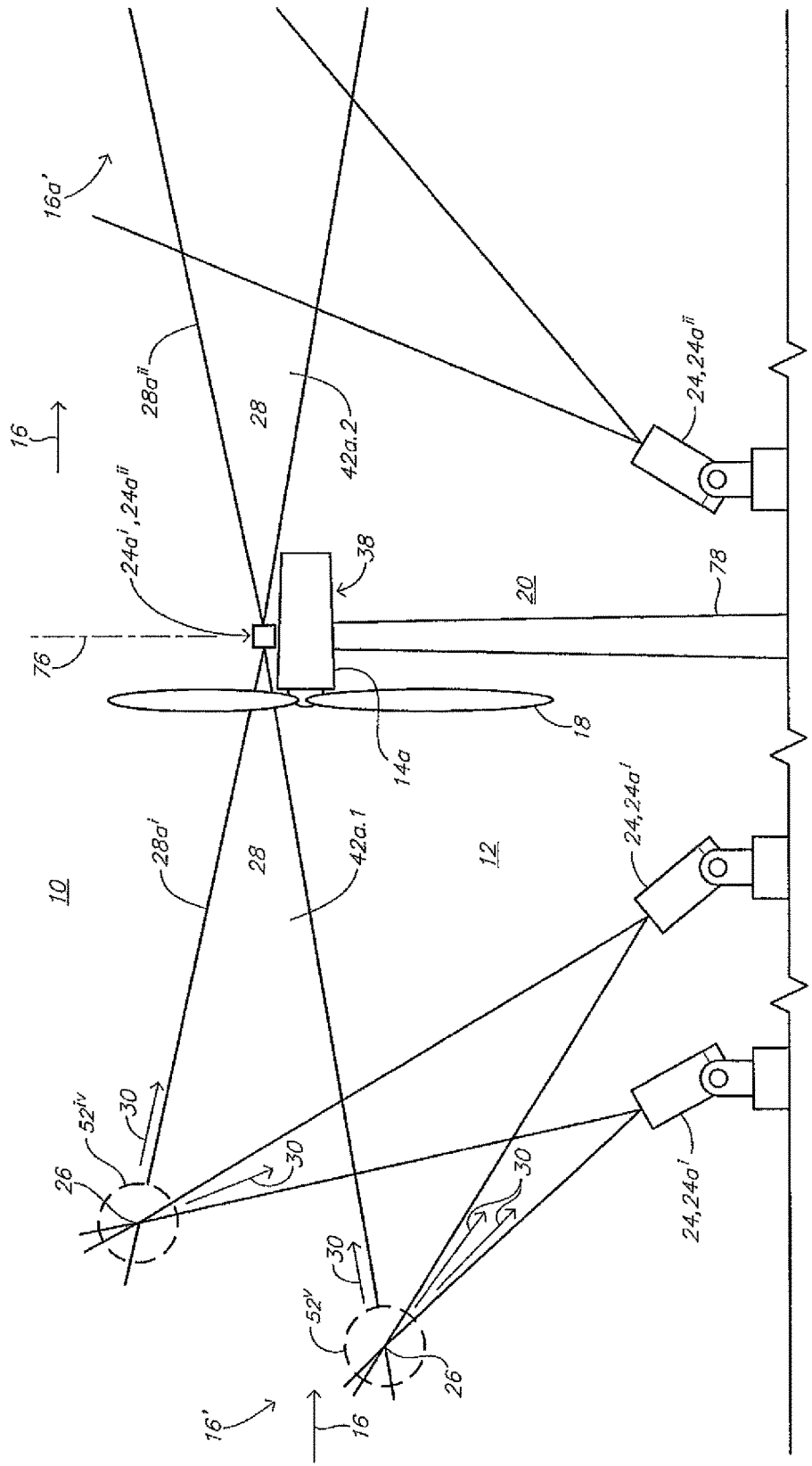
FIG. 1b illustrates a side view of a wind farm in association with an atmospheric measurement system according to one embodiment of the invention.

In a further embodiment of the atmospheric measurement system 10 and wind farm 12, as illustrated in FIG. 1b, the wind turbine 14a is illustrated with associated LIDAR sensors $24a^i$ and $24a^{ii}$ incorporating corresponding beams of light $28a^i$, $28a^{ii}$ that emanate from a central region of the rotors 18 of the associated wind turbines 14—for example, the LIDAR sensors $24a^i$ and $24a^{ii}$ being fixedly mounted atop the main body 38 of the wind turbine—and that emit the corresponding beams of light $28a^i$, $28a^{ii}$ so that the respective associated beams of light 28 sweep out corresponding conical surfaces of revolution 42a.1, 42a.2, wherein the different associated LIDAR sensors $24a^i$ and $24a^{ii}$ are illustrated pointing in different directions, for example, one sensor responsive to spatial variations of the upstream wind field 16' and the other sensor responsive to the spatial variations of the downstream wind field or wake 16a' where the wind has passed through the wind turbine 14, with the associated conical surfaces of revolution 42a.1, 42a.2 pointing in the corresponding opposite directions. Further, the LIDAR sensors $24a^i$ and $24a^{ii}$ may be positioned remotely from the wind turbine 14a. In one implementation, a single beam of light 28 is aligned with the axis of rotation of the wind turbine. In particular, the beam of light 28 is generated by a single light source and then split into two beams of light $28a^i$, $28a^{ii}$, where one or both can be either aligned with and along the axis of rotation or transversely offset relative to the axis of rotation. Alternatively, the beams of light of light $28a^i$, $28a^{ii}$ are generated by two separate light sources (not shown) that are mounted proximate to each other so as to be aligned with the axis of rotation of the wind turbine, but in opposite directions.

Figures 5A, 5B, 5C:
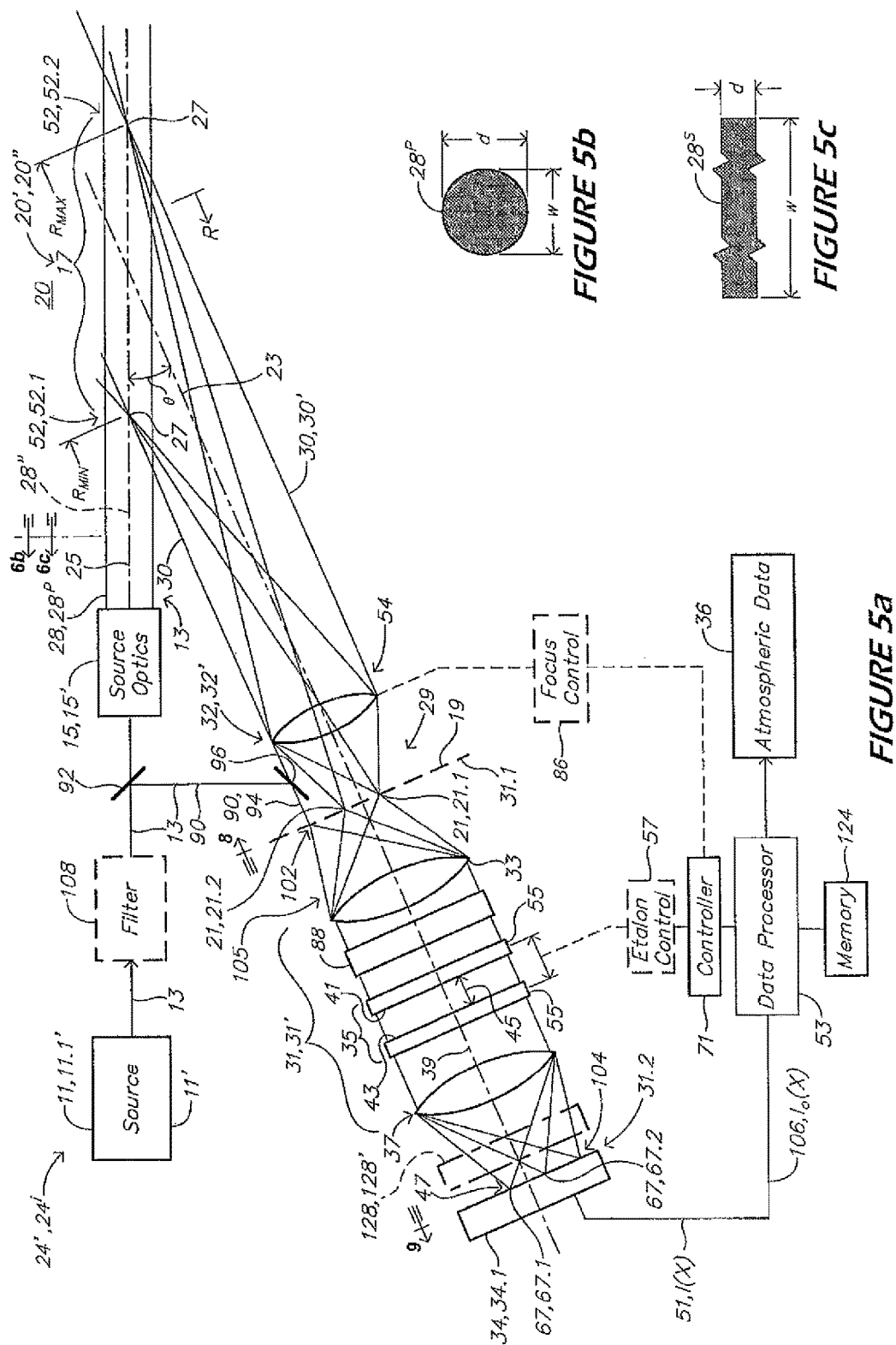
FIG. 5a illustrates a first set of embodiments of a first aspect of a range imaging LIDAR system.
FIG. 5b illustrates a transverse cross-section of a first embodiment of a beam of light.
FIG. 5c illustrates a transverse cross-section of a second embodiment of a beam of light.

With reference to FIGS. 1a and 2a, the location of a particular measurement volume 52 and the value of the associated measure of wind $\bar{v}$ collectively depend upon the locations of the associated LIDAR sensors 24 and the associated directions 46.1, 46.2, 46.3 of the associated beams of light 28 and the directions of the fields of view 54 of the associated receive optics 32 (see for example FIG. 5a). Accordingly, the accuracy to which the locations of the associated LIDAR sensors 24, the directions 46.1, 46.2, 46.3, 46a of the associated beams of light 28, and the directions of the fields of view of the 54 of the associated receive optics 32 are known or measured, and the variability thereof, will affect the accuracy and variability of the resulting calculated location of the associated measurement volume 52 and the resulting calculated measure of wind $\bar{v}$ associated therewith. When a plurality of different LIDAR sensors 24 are associated with a particular measurement volume 52, then the resulting accuracy and variability of the associated calculated location of the associated measurement volume 52 and the calculated measure of wind velocity $\bar{v}$ associated therewith will depend upon the collective accuracy and variability of the underlying locations and directions of the associated plural LIDAR sensors 24, wherein for a given level of accuracy and variability, the resulting level of accuracy needed for each associated LIDAR sensor 24 decreases as the number of associated LIDAR sensors 24 is increased.

Depending upon the underlying structure to which the LIDAR sensor 24 is mounted, the location of the LIDAR sensor 24 can be influenced by the local winds. For example, although commercial wind turbines 14 can be impressive structures, they should not necessarily be considered to be stationary. Large wind loads can cause the associated towers to bend and sway, thereby changing the associated LIDAR look angles and location, respectively, of an associated LIDAR sensor 24 mounted thereon. Changes in the LIDAR look angle(s) will produce errors in reporting the measurement vector resulting in relatively larger altitude errors at relatively longer ranges. Sway of the LIDAR sensor 24 causes an error in the resulting measure of wind velocity $\bar{v}$.

However, these errors may be accounted for by measuring the motion of each LIDAR sensor 24 with associated sensors responsive to bending and swaying of the underlying platform. The selection of the sensors will depend upon the dynamics of the particular platform. For example, for a mobile platform, an Inertial Measurement Unit, IMU, might be required to provide the necessary platform orientation, location and velocity information. In other situations, such as a portable or stationary scenario, a simple tilt sensor coupled with a compass or some other method of determining an azimuth might be sufficient. There are entire suites of sensors and techniques that may be used depending upon the platform dynamics and the required measurement accuracy. The associated measurements from each LIDAR sensor 24 can then be corrected to account for the measurement of the underlying movement thereof, for example, by correcting for Correcting the LIDAR data for platform motion is straightforward once the underlying movement has been measured.

The LIDAR sensors 24 provide for determining wind velocity $\bar{v}$ at each of the associated measurement volumes 52 from a combination of measurements along separate directions 46; and for determining a measure of atmospheric density $\rho$ associated with each measurement within each measurement volume 52, which can be averaged to provide for a single associated averaged measure of atmospheric density $\rho$ for each measurement volume 52. Accordingly, the LIDAR sensors 24 provide for determining the associated wind power flux density $\bar{\psi}$, the direction of which is given by that of the associated wind velocity $\bar{v}$.

In addition to vector measures of wind velocity $\bar{v}$ and wind power flux density $\bar{\psi}$, and the associated scalar magnitudes thereof, and the atmospheric data scalar atmospheric density $\rho$, the associated LIDAR sensors 24 provide for generating measures of atmospheric data scalars of atmospheric temperature T, molecular counts $N_M$, aerosol counts $N_A$ and background counts $N_B$, which, together with a measure of the associated sampling times $t_i$, for example, using an associated GPS receiver 38, can be stored for each measurement volume 52 so as to provide for a map of atmospheric data over space and time, which can be used for anticipatory control of the associated wind farm 12 and the associated power grid 56 supplied therefrom, or for other applications, such as weather forecasting. Depending upon the location, size and number of measurement volumes 52, the associated atmospheric measurement system 10 can provide for detecting associated atmospheric turbulence so as to provide for warning if turbulence—for example, as a from an approaching boundary layer interface (not shown)—exceeds or is expected to exceed acceptable associated turbine-dependent threshold levels for the wind turbines 14 of the wind farm 12, so as to prevent turbulence-induced damage to the wind turbines 14.

From Robert A. Brown, *Fluid Mechanics of the Atmosphere*, Academic Press, Inc., New York, 1991, which is incorporated herein by reference, it is understood that turbulence is a random velocity fluctuation from the mean wind speed and direction, wherein associated turbulent elements are vortex elements of variable size and strength and associated turbulent eddies provide for transporting fluid properties in random motion and associated properties are exchanged by rapid mixing.

In general, wind turbines 14 are pointed in a direction 48 to receive the main flow of wind 16 from the associated wind field 16', so that an associated LIDAR sensor 24 mounted on a wind turbine 14 and looking towards the incoming wind 16 is positioned optimally to measure the wind speed v directed at the wind turbine 14. However, turbulence or a velocity component that is perpendicular to the main flow could potentially damage the wind turbine 14, but might not be detectable by a LIDAR sensor 24 mounted on a wind turbine 14 and looking towards incoming the wind 16. The atmospheric measurement system 10 can incorporate additional LIDAR sensors 24 that provide for detecting this turbulence so as to provide for protecting the associated wind turbines 14 from turbulence-induced damage. More particularly, with a sufficient number and density of associated measurement volumes 52, the atmospheric measurement system 10 can provide sufficient resolution to detect turbulent eddies, vortices and billows within the atmosphere 20, and to provide an indication when changes in wind velocity $\overline{v}$ or wind power flux density $\overline{\psi}$ are sufficiently large to possibly damage one or more wind turbines 14.

More particularly, the atmospheric measurement system 10 can provide for measuring the uniformity or non-uniformity of the wind field 16', from spatially-distributed measurements of the wind velocity $\overline{v}$ field from the spatially-distributed LIDAR sensors 24 so as to provide for characterizing either turbulence or wind shear. These measurements can include approximations of the vorticity on several different length scales that are important to wind turbines 14. Measurements of an associated temperature structure parameter $C_T^2$ can also be used to identify areas where significant turbulence is occurring. A time series of temperature T may be used to compute its power spectral density for the $C_T^2$.

The atmospheric measurement system 10 can further provide for generating a measure of wind shear from measurements of wind speed v at different ranges and at different pointing angles.

The measures of turbulence and wind shear are based upon measurements along the associated beams of light 28 that are generally angled with respect to horizontal and vertical, with associated distances being with respect to the associated source 11. These distances may be either transformed to corresponding altitudes for purposes of determining the above measures of turbulence and wind shear. Alternatively, the above measures of turbulence and wind shear may be made with respect to an associated slant range. Generally, at least three different beams of light 28 would be used, with at least two of those beams of light 28 at an angle with respect to horizontal. Generally the aerosol to molecular ratio could be measured along each beam that has an angle with respect to the horizontal.

There are no absolute requirements on the spacing of measurements in either space or time. One could determine turbulence with a single measurement, or one could use a time series of measurements to determine turbulence. If the aerosol to molecular ratio changes suddenly with respect to altitude within a single measurement, that could be an indicator of turbulence. Similarly, turbulence could be determined by using a time series for each altitude.

The threshold values can be determined based on the measurement precision and the characteristics of the wind turbine, with different wind turbines having different thresholds. The measurement precision defines a lower bound based on probability. Generally, the false alarm rate would also be considered along with the probability of detection.

Referring to FIG. 2a, the atmospheric measurement system 10 provides for either communication between the LIDAR sensors 24 and a central, network or cloud processor 60, or for communication amongst the associated LIDAR sensors 24, so as to provide for exchanging pertinent data as necessary to construct a map, model or database 62 of the associated atmospheric data with respect to space and time. For example, the communication can be by either a wire or fiber-optic communication channel 64 or by a wireless communication channel 66, using either direct or networked interconnections. For example, among other techniques, data may be communicated wirelessly via either a satellite or ground-based transponder, and networked communications may use an Ethernet protocol.

For example, in a centralized, hierarchical system 68, the separate LIDAR sensors 24 provide their measurements to the central, network or cloud processor 60 which then calculates the associated wind velocity $\overline{v}$ and wind power flux density $\overline{\psi}$ for the various measurement volume 52, possibly using measurements from separate associated LIDAR sensors 24, and combines these calculated vector measures with the associated atmospheric data scalars in the map, model or database 62 that can then be distributed to the various wind turbines 14 for control thereof. The centralized, hierarchical system 68 can include various sub-processors 70 that interface with subsets of associated LIDAR sensors 24 and communicate the information therefrom to the central, network or cloud processor 60 while also possible combining measurements from the associated LIDAR sensors 24 in communication therewith so as to provide for determining the necessary local set of atmospheric data needed for local control of the associated wind turbines 14.

As another example, in a decentralized system 72, each particular LIDAR sensor 24 provides for communicating with other LIDAR sensors 24 so as to acquire the data therefrom as necessary to determine the corresponding atmospheric data for the measurement volume 52 or measurement volumes 52 associated with that particular LIDAR sensor 24. For example, referring to FIG. 2a, the third LIDAR sensor 24.3 could communicate with the fourth 24.4 and fifth 24.5 LIDAR sensors so as to obtain the associated measures of wind speed v as necessary to determine the associated wind velocity $\overline{v}$ for the measurement volumes $52^{iv}$, $52^v$ associated therewith. Generally, the measurement volumes 52 of different LIDAR sensors 24 may overlap, in which case the LIDAR sensors 24 associated with the overlapping measurement volumes 52 could each generate their own associated localized map, model or database 62 as the associated atmospheric data that can be used by the wind turbine 14 or wind turbines 14 associated with each LIDAR sensor 24. For example, similar to the third LIDAR sensor 24.3, the fourth LIDAR sensor 24.4 could communicate with the third 24.3 and fifth 24.5 LIDAR sensors, and the fifth LIDAR sensor 24.5 could communicate with the third 24.3 and fourth 24.4 LIDAR sensors, so as to obtain the associated measures of wind speed v as necessary to determine the associated wind velocity $\bar{v}$ for the same measurement volumes $52^{iv}$, $52^{v}$.

A decentralized system 72 can be operated in either a request mode or a broadcast mode, depending upon the nature of the communication between LIDAR sensors 24. In accordance with the request mode of operation, a particular LIDAR sensor 24 sends out a request for atmospheric measurement records 40 for information associated with particular measurement volumes 52, or within a particular geographic regions, and other LIDAR sensors 24 in communication therewith that can provide atmospheric data for the specified location or geographic criteria then return the requested atmospheric measurement records 40. In a broadcast mode, each particular LIDAR sensor 24 broadcasts its atmospheric measurement records 40 to the associated communication network 74, from which other LIDAR sensors 24 can then select and use those atmospheric measurement records 40, for example, to calculate a composite atmospheric measurement record 40' for one or more common measurement volumes 52, or for compiling a local map, model or database 62. A decentralized system 72 can provide for improved fault tolerance, reliability and robustness by distributing information and associated decision processes amongst a group of associated, or all, LIDAR sensors 24, thereby avoiding the prospect of single-point failure that might otherwise be possible with some embodiments of a centralized, hierarchical system 68.

Generally, each LIDAR sensor 24 could have a pre-assigned measurement volume 52 over which to perform associated data analysis, wherein external data that is within that measurement volume 52 is incorporated in the generation of a local atmospheric map, model or database 62, for example of wind power flux density $\bar{\psi}$, wind velocity $\bar{v}$, atmospheric density $\rho$, atmospheric temperature T, and the ratio of molecular counts $N_M$ to aerosol counts $N_A$. Each atmospheric measurement record 40 could first be filtered to determine if it is within the assigned measurement volume 52. Atmospheric measurement records 40 from measurements located within the assigned measurement volume 52 could then be processed further to determine the relative proximity thereof by computing the relative distances between the locations associated therewith.

Atmospheric data from the atmospheric measurement system 10 can be used for controlling the wind turbines 14 of an associated wind farm 12—or of a plurality of wind farms 12 within the geographic extent of the associated map, model or database 62 compiled by the atmospheric measurement system 10—or the power grid 56 supplied therefrom. The associated LIDAR sensors 24 need not be located exclusively at wind sites or with overlapping fields of view 54.1, 54.2, 54.3 (see FIG. 4) in order to provide useful information to the wind farm 12. Furthermore, as illustrated in FIGS. 1a and 2a. The LIDAR sensors 24 need not necessarily be mounted on associated wind turbines 14. For example, LIDAR sensors 24 located kilometers away from the wind farm 12 can make atmospheric measurements that can be combined with measurements from other LIDAR sensors 24 within the region of the wind farm 12 so as to provide a larger scale estimation of wind energy potential in an approaching air mass. At longer ranges, small scale turbulences are not necessarily as important because they may dissipate by the time they reach the wind farm 12.

Although a map, model or database 62 of atmospheric data for the wind field 16' local to a particular wind turbine 14 can be useful for immediate control of the particular wind turbine 14, a map, model or database 62 of atmospheric data for the wind field 16' over and upstream of the entire wind farm 12 provide for a coordinated control of the associated wind turbines 14 and the associated power grid 56 so as to provide for extracting as much power as either possible or necessary from the wind field 16' while protecting the associated wind turbines 14 from damage, for example, as a result of excessive wind speed v or turbulence. A regional or global map, model or database 62 of atmospheric data could be provided by a centralized, hierarchical system 68, or could be compiled from separate maps, models or databases 62 that are separately generated by the separate LIDAR sensors 24 of a decentralized system 72. Atmospheric data from adjacent and/or up-wind LIDAR sensors 24 can improve measurement resolution, measurement accuracy, and turbulence or wind shear estimation of other LIDAR sensors 24, perhaps in conjunction with weather modeling or forecasting software, or in conjunction with other sources of weather data. In a decentralized system 72, in addition to the individual map, model or database 62 local to a particular wind turbine 14, atmospheric data from the entire wind farm 12 can be compiled and a detailed large scale three dimensional wind power density, wind velocity, turbulence, density, molecular to aerosol scattering ratio and temperature maps can be generated. These maps can be maintained for historical purposes and for sale to others such as weather forecasters who could find the data beneficial in their enterprises. In addition to the information mentioned above, the LIDAR sensors 24 are able to measure the extinction coefficient at their operational wavelength and the aerosol-to-molecular scattering ratio which could be used to locate the boundary layer interface and estimate visibility.

As each new measurement is added to the map, model or database 62, it is compared to previous measurements to determine if the new measurement indicates significant changes in the current conditions. New measurements are compared to the mean and standard deviation that are calculated on a window of time history data. Deviations between the measured value and the expected value are indicative of changes, and if the deviation exceeds established limits, appropriate warnings are issued. In one example if the wind speed v suddenly decreases, one might want to prepare to tap stored energy to take up the slack. In another example, if the temperature data indicates thermal turbulence, then one might expect turbulence to strike the wind farm 12 or wind turbine 14 in the near future.

For example, referring to FIG. 2a, each wind turbine 14 could incorporate an associated controller 80 for controlling the associated generator 82 and rotor 18 of the wind turbine 14, and for controlling the orientation of the rotor 18 relative to the local direction 50 of the wind 16, wherein the generators 82 are connected to the power grid 56 so as to provide for supplying electrical power thereto. In one mode of operation, the wind turbines 14 are controlled so as to generate the maximum amount of electrical power available from the wind, and atmospheric data from the atmospheric measurement system 10 is used to anticipate atmospheric conditions that could be potentially damaging to the wind turbine 14 so that the controller 80 can control the wind turbine 14—for example, by feathering the rotor 18 or turning the wind turbine 14 out of the wind—so as to prevent damage to the elements thereof. In another mode of operation, the controller 80 can use the information of the wind power flux density $\bar{\psi}$ to anticipate the amount of electrical power that can be generated by the wind turbine 14, and responsive to a demand signal 84 from the power grid 56, possibly in cooperation or coordination with signals from other controllers 80 of the wind farm 12, then the controller 80 controls the elements of the wind turbine 14 so as to generate and supply the appropriate amount of electrical power to the power grid 56. Atmospheric data from the atmospheric measurement system 10, i.e. the associated map, model or database 62, can be provided to the power grid 56 so that the power grid 56 can anticipate the amount of electrical power that could potentially be available from the wind farm 12, for example, for peaking power if necessary.

Wind velocity $\bar{v}$ provides the information necessary to generate extended maps showing the location of a particular air mass with its temperature T, density $\rho$, and molecular-to-aerosol ratio. A spatial rather than the temporal view provides another independent method for examining data and projecting when the wind power will interact with the wind turbine 14. Knowing that a neighboring wind farm 12 or wind turbine 14 has just detected a wind change event is a strong indicator that the current wind farm 12 or wind turbine 14 might also experience that same event in the near future. It is highly unlikely that a wind gust could hit all the wind turbines 14 in an installation at the same time. It is more likely that some wind turbines 14 could be subjected to the disturbance before others.

Figure 2B:
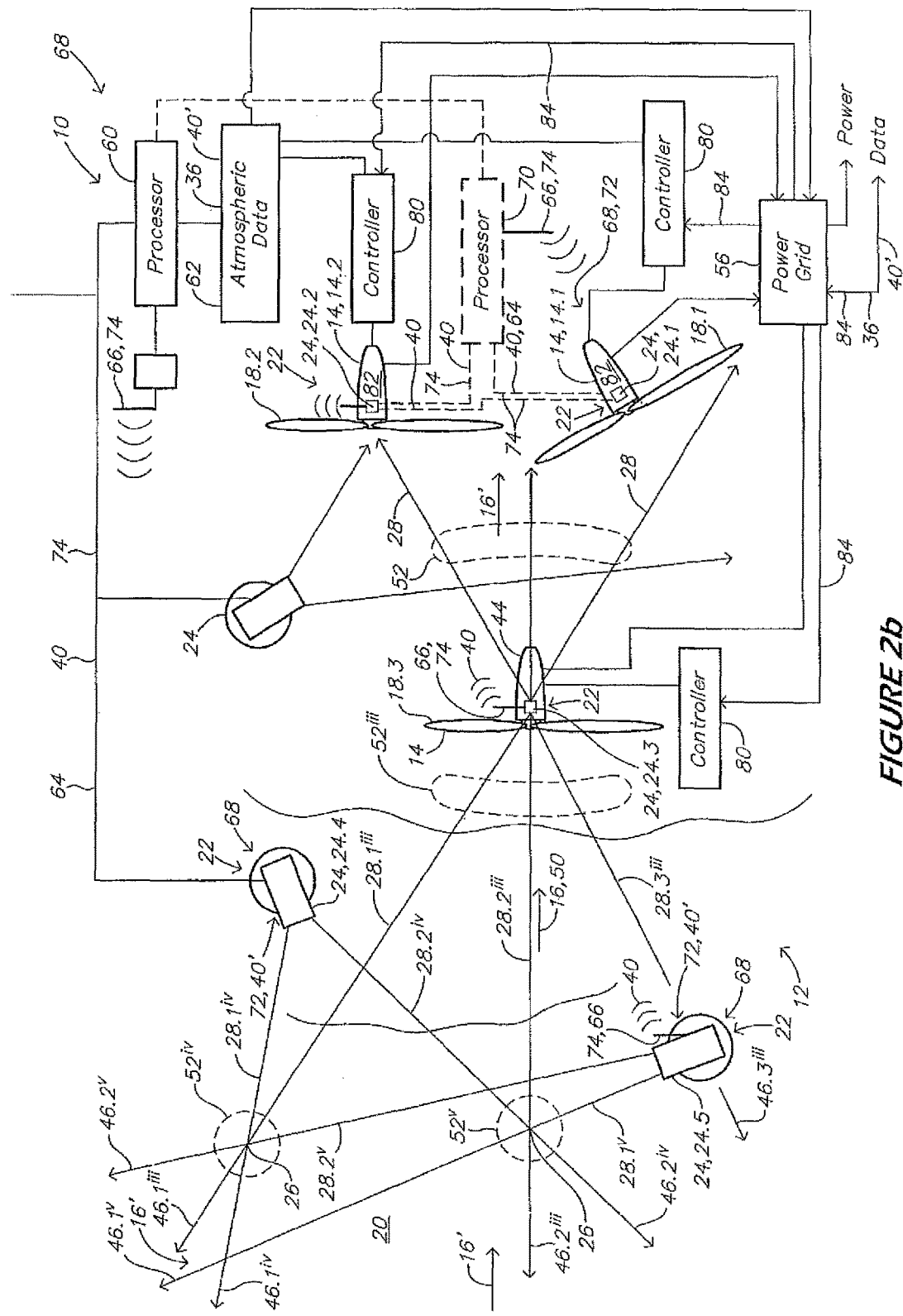
FIG. 2b illustrates a top view of the wind farm and associated atmospheric measurement system illustrated in FIG. 1b.

With respect to the embodiment using beams of light 28 aimed at both the upstream and downstream directions of the wind, as shown in FIG. 2b, the structure and operation of the atmospheric measurement system 10 described hereinabove would be applicable modified at least to the extent to accommodate and/or exploit the additional data and capabilities achieved by using both upstream and downstream measurements of the wind field 16'. In particular, the atmospheric measurement system 10 can incorporate additional LIDAR sensors 24 either positioned in or at least directed toward the upstream and the downstream sides of the turbines so as to provide for detecting upstream and downstream turbulence thereby protecting the associated wind turbines 14 from turbulence-induced damage. More particularly, with a sufficient number and density of associated measurement volumes 52 upstream and downstream of the wind turbines 14, the atmospheric measurement system 10 can provide sufficient resolution to detect turbulent eddies, vortices and billows within the atmosphere 20, and to provide an indication when changes in wind $\bar{v}$ or wind power flux density $\bar{\psi}$ are sufficiently large to possibly damage one or more wind turbines 14. Even further, the atmospheric measurement system 10 can provide for measuring the uniformity or non-uniformity of the wind field 16', both upstream and downstream, from spatially-distributed measurements of the wind $\bar{v}$ field from the spatially-distributed LIDAR sensors 24 so as to provide for characterizing either turbulence or wind shear. These measurements can include approximations of the vorticity on several different length scales that are important to wind turbines 14.

As discussed above, the measures of turbulence and wind shear are based upon measurements along the associated beams of light 28 that are generally angled with respect to horizontal and vertical, with associated distances being with respect to the associated source 11 and may be transformed to corresponding altitudes for purposes of determining turbulence and wind shear with respect to an associated slant range. Generally, at least three different beams of light 28 in the upstream and downstream directions would be used, with at least two of those beams of light 28 in one direction at an angle with respect to horizontal. The aerosol to molecular ratio could be measured along each beam that has an angle with respect to the horizontal.

Figure 1C:
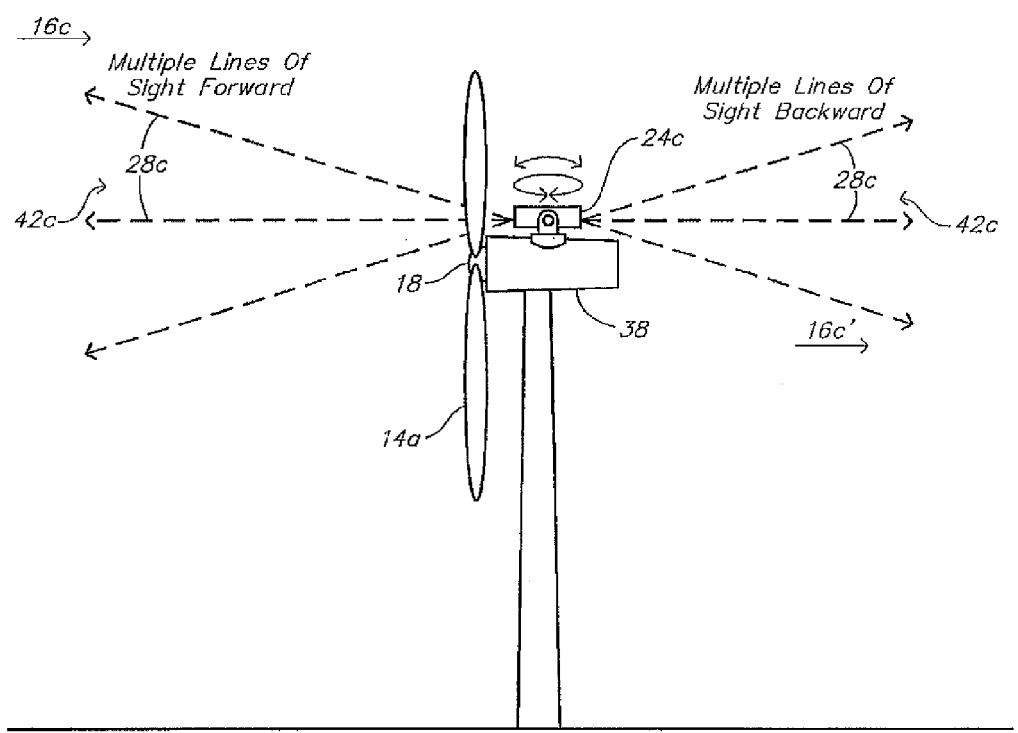
FIG. 1c illustrates a side view of a wind farm in association with an atmospheric measurement system according to a further embodiment of the invention.

In an alternative embodiment, instead of having multiple lines of sight looking only forward and backward (upstream and downstream) of a wind turbine from fixedly-mounted LIDAR sensors $24a^i$ and $24a^{ii}$, the present invention may also relate to an apparatus that uses LIDAR to measure wind direction and speed by making measurements along slightly different lines of sight, or by pointing the LIDAR in different directions. By making measurements along a plurality of different lines of sight, data indicative of atmospheric condition in three-dimensions can be generated. As shown in FIG. 1c, the wind turbine 14a is illustrated with at least an associated LIDAR sensor 24c incorporating corresponding beams of light 28c that emanate from a central region of the rotors 18 of the associated wind turbines 14—for example, from a gimbal-mounted LIDAR 24c attached to the top of the main body 38. The gimbal-mounted LIDAR sensor 24c can rotate 360° while directing or scanning the corresponding beams of light 28c, so that the respective associated beams of light 28c sweep out corresponding conical surfaces of revolution 42c. Additional remotely positioned LIDAR sensors 24 may be used pointing in different directions to be responsive to spatial variations in various directions relative to wind field 16c and/or the wake 16c' where the wind has passed through the wind turbine 14.

As a result of mounting the LIDAR sensor 24c so as to be movable (i.e., gimbal-mounted), the LIDAR sensor 24 can generate multiple lines of sight, wherein two lines of sight allow one to measure wind direction in the plane defined by the two lines of sight. Three non-coplanar lines of sight would provide the information necessary to determine a full 3-dimensional wind velocity vector. Thus, in addition to being able to measure wind shear, which by definition is the difference in wind speed relative to altitude above the ground, the atmospheric measurement system 10 can now measure wind veer which refers to the change in wind direction relative to altitude.

Atmospheric data from the atmospheric measurement system 10 can be made commercially available to operators of wind farms 12, or for other purposes. For example, the atmospheric data, continuously gathered from various altitudes, can be used for weather forecasting. Instead of obtaining atmospheric profiles twice a day at sixty-nine sites throughout the continental United States under current practice, atmospheric data from the atmospheric measurement system 10 could be streamed continuously from thousands of LIDAR sensors 24 distributed across the country, or across other countries or regions, which can lead to more accurate weather forecasts. For example, for an atmospheric measurement system 10 primarily developed for use by wind farms 12, available atmospheric data from associated LIDAR sensors 24 that is not of direct use or need for operation of a wind farm 12, but which could have value for meteorological forecasts, could be included in the associated map, model or database 62. This additional data such as molecular to aerosol scattering ratio and extinction coefficient could be made commercially available to other interested parties. Furthermore, the atmospheric data may be further processed to establish visibility or other metrics that might be peculiar to weather forecasting.

Global trend monitoring, for example, via cloud-based computing, can also be applied to analyzing climate change, pollution (dust, aerosols), weather patterns and volcanic events (particulates). Predictive analytics and other learning-based software paradigms can be applied on an individual turbine, wind farm, or grid level to provide learning-based optimization through a learning module. The learning module consists of a processor, for example quad core computer combined with GPUS, which runs the predictive analytics software. On an individual turbine, the learning module collects data from the LIDAR as well as the turbine. As new data is collected, the predictive analytics software optimizes the control inputs to the turbine to minimize the effects of wind loading and maximize turbine health and lifetime. Over time, the learning module produces an optimal set of control system commands in response to the LIDAR atmospheric measurements, customized for the performance of each individual turbine. Effects such as turbulence and shear may differ for individual turbines and require different responses, depending on the type, size, and age of the turbine. Those effects are incorporated automatically into the learning module without the need for direct supervisory control. On a wind farm SCADA level, a learning module identifies trends in the overall health of each individual turbine that can be used to predict problems and optimize performance or maintenance schedules of other turbines within the farm.

The networking of LIDAR sensors 24 allows the lifetime of each sensor to be extended. This is accomplished by turning off some sensors or placing them in a standby mode that minimizes the operational state or duty cycles of the components, thereby extending the sensor lifetime and reducing maintenance and repair requirements. One or more LIDAR sensors 24 would remain in full operation and provide data to the other sensors in the atmospheric measurement system 10, thereby acting as sentries to warn of changing weather conditions. In one embodiment, most LIDAR sensors 24 in the atmospheric measurement system 10 are placed in standby mode, with wind speeds averaging less than a certain value, for example one meter per second, over a period of time; one or more LIDAR sensors 24 in an atmospheric measurement system 10 of sensors remain in full operation, monitoring wind speeds; when average wind speeds over a period of time exceed a certain value, for example two meters per second, some or all of the other sensors in the atmospheric measurement system 10 are placed in full operational mode again.

Using the same approach, the reliability of the entire atmospheric measurement system 10 is increased since a failure with one of the LIDAR sensors 24 can be mitigated by sending data from other sensors in the atmospheric measurement system 10 to that node, essentially introducing multiple levels of redundancy and backup into the atmospheric measurement system 10. In one embodiment, a LIDAR sensor 24 being used for turbine control fails, but within a short time period, data from the other sensors in the atmospheric measurement system 10 is used to replace the function of the failed sensor, ensuring the continual safe operation of the turbine.

The aforementioned U.S. application Ser. No. 12/780,895 filed on 15 May 2010, entitled Range Imaging LIDAR illustrates various embodiments of LIDAR sensors 24 and associated platforms that may be incorporated in the atmospheric measurement system 10.

Referring to FIG. 5a, in accordance with a first aspect, a range imaging LIDAR system $24'$, $24^i$ incorporates a light source 11 that provides for generating at least substantially monochromatic light 13, which is projected into the atmosphere 20 as a beam of light 28 through and by associated source optics 15. For example, the source optics 15 may comprise a lens assembly $15'$ that provides for the width and divergence of the beam of light 28, and a suitable location of the associated beam waist thereof, so as to illuminate an interaction region 17 within the atmosphere 20 that is detectable by the range imaging LIDAR system $24'$, $24^i$, wherein the beam width within the interaction region 17 establishes the associated transverse spatial resolution limit of the range imaging LIDAR system $24'$, $24^i$. For example, referring to FIG. 5b, the source optics 15 may be configured so as to provide for a pencil-like beam of light $28'$ having a limited width w and depth d, for example, of circular or elliptical cross-section, so as to limit the associated width w and depth d of the associated interaction region 17. As another example, referring to FIG. 5c, the source optics 15 may be configured so as to provide for a sheet-like beam of light $28''$—for example, using source optics 15 comprising cylindrical optics—having a limited depth d but an extended width w, for example, so as provide for an associated interaction region 17 with a corresponding extended width w, so as to provide for probing extending regions of the atmosphere 20.

A set of receive optics 32, for example, a telescope $32'$, laterally offset from the beam of light 28, provides for imaging a portion of the beam of light 28 onto an intermediate image plane 19, so as to provide for a one-to-one mapping of volumetric elements 52 within the beam of light 28 and corresponding associated regions or points 21 in the intermediate image plane 19. More particularly, the beam of light 28 illuminates molecules $20'$ or aerosols $20''$ of the atmosphere 20, or a combination thereof, within the interaction region 17, which in turn scatter the monochromatic light 13 of the beam of light 28. The resulting scattered light 30 within the field-of-view 54 of the receive optics 32 is collected thereby and imaged onto the intermediate image plane 19. The receive optics 32 is laterally offset from and points towards the beam of light 28, so that the optic axis 23 of the receive optics 32 is inclined relative to the optic axis 25 of the beam of light 28 at an associated parallax angle $\theta$. Accordingly, each volumetric element 52 of the beam of light 28 imaged onto a corresponding region or point 21 on the intermediate image plane 19 corresponds to a different nominal range R from the intermediate image plane 19 to a point 27 on the optic axis 25 of the beam of light 28 associated with the corresponding volumetric element 52. Accordingly, each region or point 21 on the intermediate image plane 19, corresponding to the volumetric element 52 of the beam of light 28 within the field-of-view 54 of the receive optics 32, corresponds to a different nominal range R. Accordingly, different regions or points 21 of the intermediate image 29 in the intermediate image plane 19 correspond to different nominal ranges R to the beam of light 28, and therefore correspond to different nominal ranges R to the associated volumetric elements 52 thereof within the interaction region 17. For example, as illustrated in FIG. 5a, a closest volumetric element 52.1 of the beam of light 28 within the field-of-view 54 of the receive optics 32 located at a closest nominal range $R_{MIN}$ from the intermediate image plane 19 is imaged as a corresponding first region or point 21.1 on the intermediate image plane 19, and a farthest volumetric element 52.2 of the beam of light 28 within the field-of-view 54 of the receive optics 32 located at a farthest nominal range $R_{MAX}$ from the intermediate image plane 19 is imaged as a corresponding second region or point 21.2 on the intermediate image plane 19. Furthermore, scattered light 30 from different volumetric elements 52 is imaged onto the intermediate image plane 19 at corresponding different angles of incidence relative thereto. The range R to the interaction region 17 is defined by the geometry of the associated beam of light 28 and the corresponding receive optics 32. The receive optics 32 can be in focus for one of a plurality of different ranges to the beam of light 28, so that for volumetric elements 52 of the beam of light 28 not in focus, the corresponding images thereof in the intermediate image plane 19, i.e. the corresponding regions or points 21 thereon, will be unfocused and therefore blurred. The range R within the interaction region 17 can optionally be further resolved with associated temporal range gating, or range-resolved imaging, of the associated scattered light 32 if desired or necessary for a particular application.

The range imaging LIDAR system 24', 24$^i$ further comprises a Fabry-Pérot interferometer 31 having an input focal plane 31.1 and an output focal plane 31.2. The input focal plane 31.1 is collocated with the intermediate image plane 19 so as to receive scattered light 30 therefrom, which is then processed by the Fabry-Pérot interferometer 31 and imaged onto a detection system 34 located at the output focal plane 31.2. Between the input 31.1 and output 31.2 focal planes, the Fabry-Pérot interferometer 31 comprises a collimating lens 33, a Fabry-Pérot etalon 35, and imaging optics 37 spaced along an associated common optic axis 39, wherein the input focal plane 31.1 is a focal plane of the collimating lens 33, the output focal plane 31.2 is a focal plane of the imaging optics 37, and scattered light 30 at the input focal plane 31.1 entering the collimating lens 33 is substantially collimated thereby, then processed by the Fabry-Pérot etalon 35, and finally imaged onto the detection system 34 by the imaging optics 37. The Fabry-Pérot etalon 35 of the Fabry-Pérot interferometer 31 comprises first 41 and second 43 partially-reflective surfaces that are parallel to one another and separated by a fixed gap 45.

For example, in one embodiment, the Fabry-Pérot etalon 35 comprises a pair of planar optical windows 55—for example, constructed of either optical glass or fused quartz—aligned parallel to and facing one another, and spaced apart from one another by the gap 45, wherein, for example, the first 41 and second 43 partially-reflective surfaces—e.g. partially-silvered surfaces or other partially-reflective surfaces—are on separate facing surfaces of the planar optical windows 55. Alternatively, the first 41 and second 43 partially-reflective surfaces could be on the outside opposing faces of the planar optical windows 55, or one of the first 41 and second 43 partially-reflective surfaces could be on an inner facing surface of one of the planar optical windows 55, and the other of the first 41 and second 43 partially-reflective surfaces could be on an outer facing surface of the other of the planar optical windows 55. In one embodiment, the gap 45 is substantially fixed, whereas in other embodiments, the gap 45 is moveable, e.g. adjustable, for example, using an etalon control actuator 57 responsive to a controller 59 operatively associated with or a part of the data processor 53, so as to provide for a tunable Fabry-Pérot etalon 35.

Figure 5D:
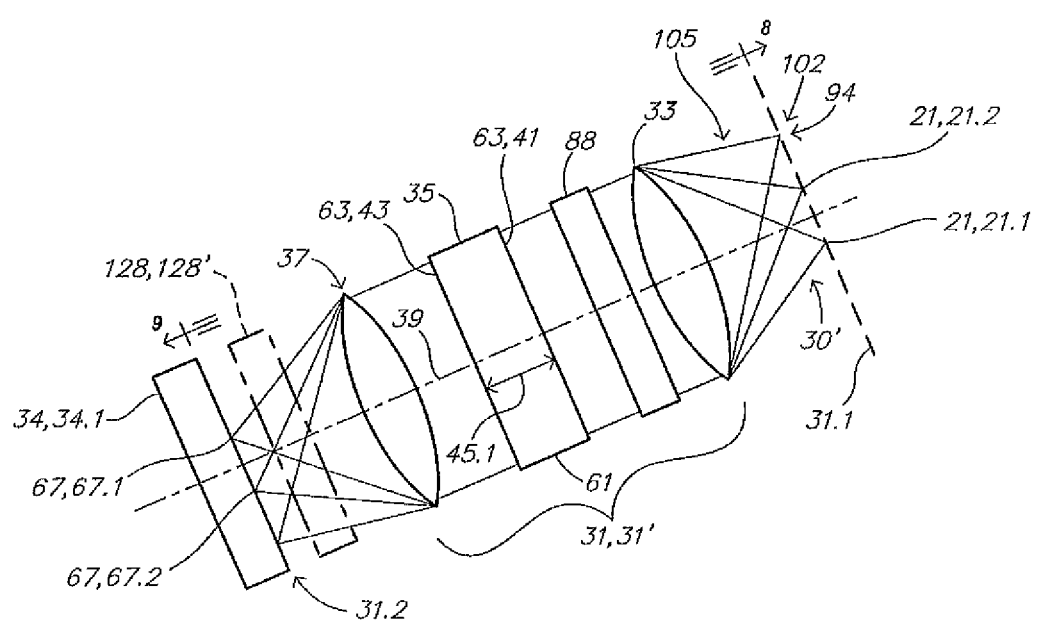
FIG. 5d illustrates a second aspect of a Fabry-Pérot interferometer of a range imaging LIDAR system.

Referring to FIG. 5d, alternatively, the Fabry-Pérot etalon 35 could comprise a solid optical element 61—for example, constructed of either optical glass or fused quartz—with planar parallel faces 63 comprising first 41 and second 43 partially-reflective surfaces separated by a gap 45.1 constituting the length of the solid optical element 61.

The range imaging LIDAR system 24', 24$^i$ further incorporates a filter system 88 to filter the scattered light 30 received by the receive optics 32 so as to prevent background light from being detected by the detection system 34. For example, referring to FIGS. 6a, 6d and 11, in one set of embodiments, the filter system 88 is located within the Fabry-Pérot interferometer 31 between the collimating lens 33 and the Fabry-Pérot etalon 35. For example, referring to FIG. 6, in one embodiment, the filter system 88 incorporates eight bandpass filter mirrors 88' having associated filter pass bands centered about the operating frequency of the light source 11 The filter system 88 exhibits high out-of-band rejection, as well as low in-band attenuation, and the bandwidth of the filter system 88 is sufficiently narrow so as to substantially filter or remove components of solar radiation or stray light in the collected scattered light 30, yet sufficiently broad so as to be substantially larger than the bandwidth of the thermally-broadened spectrum in combination with the largest expected associated Doppler shift. For example, in one embodiment, the filter system 88 is adapted so as to provide for maximum filtering of light frequencies that are outside the frequency band of interest, e.g. greater than about 2 nanometers (nm) above or below the nominal center frequency of the light source 11.

Figure 6:
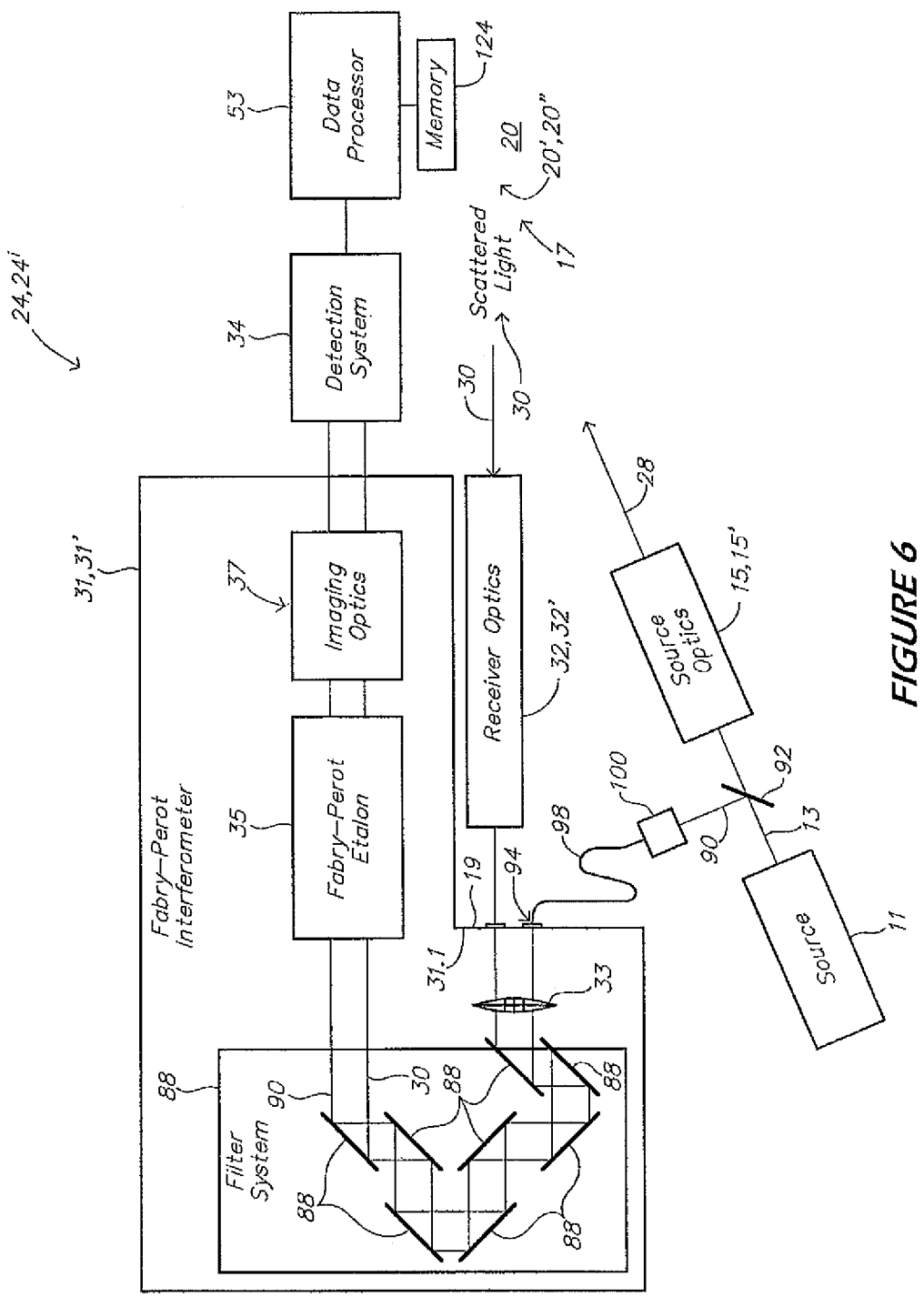
FIG. 6 illustrates a third aspect of a Fabry-Pérot interferometer of a range imaging LIDAR system.

The Fabry-Pérot interferometer 31 is subject to mechanical defects and thermally induced drift that can be compensated through calibration using a reference beam portion 90 of the substantially monochromatic light 13 extracted from the light source 11 with a beam splitter optic 92 and then input to the Fabry-Pérot interferometer 31 at the intermediate image plane 19 as a reference source 94. For example, referring to FIG. 5a, in accordance with a first embodiment, the reference source 94 from the beam splitter optic 92 is directed into the Fabry-Pérot interferometer 31 with a mirror 96. Referring to FIG. 6, in accordance with a second embodiment, the reference beam portion 90 of the monochromatic light 13 extracted from the light source 11 with a beam splitter optic 92 as the reference source 94 is input to fiber optic 98, for example, using a graded index (GRIN) lens 100, the output of which is located at the intermediate image plane 19 so as to illuminate the collimating lens 33 of the Fabry-Pérot interferometer 31 therefrom. Accordingly, for either embodiment, the reference source 94 is input to the Fabry-Pérot interferometer 31 from a location 102 on the intermediate image plane 19/input focal plane 31.1 that is distinct from the intermediate image 29 of the scattered light 30, and is processed by the Fabry-Pérot interferometer 31 so as to generate a corresponding reference fringe pattern 104 comprising one or more associated arcuate fringes (not shown) at a corresponding location on the output focal plane 31.2, which is then detected by the detection system 34 so as to generate a corresponding reference electronic image signal 106 responsive thereto, which is then processed as described hereinbelow by the associated data processor 53 together with the scatter electronic image signal 51 associated with the scatter fringe pattern 47 from the scattered light 30.

The light source 11 provides for generating a sufficient amount of sufficiently narrow-band monochromatic light 13 so as to provide for a sufficient amount of scattered light 30 so that the resulting scatter fringe pattern 47 is detectable by the detection system 34 with a sufficient signal-to-noise ratio (SNR) so that the resulting atmospheric data 36 determined therefrom is accurate within a given accuracy threshold and provides for an information temporal bandwidth that is within a given temporal bandwidth threshold. For example, the light source 11 could comprise one or more lasers, light emitting diodes (LEDs), flash lamps, for example, xenon flash lamps, sodium lamps or mercury lamps. The light source 11 may be either continuous or pulsed, and need not necessarily be coherent. If the spectral bandwidth of the light source 11 is not inherently substantially less than the expected minimum Doppler shifts to be measured, then the output of the light source 11 may be filtered with a filter 108 so as to provide for generating sufficiently monochromatic light 13 so as to enable Doppler shifts in the scattered light 30 to be measured sufficiently accurately so as to provide for resolving velocity sufficiently accurately, i.e. less than a given threshold. The particular operating wavelength of the range imaging LIDAR system 24', 24' is not limiting. For example, any optical wavelength that interacts with that which is being sensed in the associated interaction region 17 may be used.

For example, in one embodiment, the substantially monochromatic light 13 comprises ultraviolet (UV) laser light at a wavelength of about 266 nm that is generated using a laser light source 11. A wavelength of about 266 nm, being invisible to the human eye and substantially absorbed by the atmosphere, is beneficial for its stealth, eye safety and molecular scattering properties. There is relatively little natural background light at this frequency due to absorption of most natural 266 nm light by ozone and molecular oxygen. Ultraviolet light at about 266 nm is readily absorbed by glass and plastic, such as used in aircraft wind screens, which provides for improved eye safety. The particular operating wavelength of the range imaging LIDAR system 24' is not limiting, and it should be understood that any optical wavelength that interacts with that which is being sensed in the associated interaction region 17 may be used. Further discussion on the operating wavelengths of range imaging LIDAR systems, as well as the fringe patterns generated by the use of a Fabry-Pérot interferometer may be found in the parent U.S. National Stage application Ser. No. 13/387,553, and in U.S. Pat. No. 7,495,774 which is incorporated herein by reference.

The range imaging LIDAR system 24' provides for directly detecting laser energy scattered off of either molecules 20' of the atmosphere, aerosols 20" in the atmosphere, or a combination of the two, provides for directly measuring the associated velocity and direction, density, and temperature of the atmosphere, and provides for deriving other measurements therefrom, for example, a set of air data products. For example, relatively short wavelength laser energy is scattered by molecules of the atmosphere in accordance with Rayleigh scattering. Laser energy can also be scattered by aerosols in the atmosphere in accordance with Mie scattering. Rayleigh scattering generally refers to the scattering of light by either molecules or particles having a size less than about $\frac{1}{10}^{th}$ the wavelength of the light, whereas Mie scattering generally refers to scattering of light by particles greater than $\frac{1}{10}^{th}$ the wavelength of the light. Being responsive to Rayleigh scattering, the range imaging LIDAR system 24' is therefore responsive to the properties—e.g. velocity, density and temperature—of those molecules in the atmosphere giving rise to the associated scattering of the light detected by the range imaging LIDAR system 24'. Accordingly, the range imaging LIDAR system 24" provides for operation in clean air, i.e. in an atmosphere with no more than a negligible amount of aerosols 20", depending substantially only upon molecular scatter.

The substantially monochromatic light 13 from the laser 11' is divided by a beam splitter optic 92 into a reference source 94 and the beam of light 28, the latter of which in some embodiments may be further divided into a plurality of beams of light 28 by beam steering optics, for example, incorporating beam splitting mirrors, prisms, a combination thereof, or some other type of beam splitter, each different beam of light 28 directed in a different direction into the atmosphere 20. The scattered light signals 30' and reference source 94 are each first collimated by a collimator, e.g. a collimating lens 33, then filtered by a filter system 88 as described hereinabove, and then processed by an associated Fabry-Pérot etalon 35, the output of which is imaged by associated imaging optics 37 as associated circular fringe patterns 65 onto the associated detection system 34. The associated optical components are adapted for the frequency and power levels of operation. For example, for a range imaging LIDAR system 24' incorporating a Nd:YAG laser 11.1' operating at 355 nanometers, the optical elements would incorporate UV-grade fused silica substrates and standard anti-reflection coatings tuned for 355 nanometers.

The range imaging LIDAR system 24' can take advantage of aerosols when present, but does not rely upon their presence. The reference light signal 105 and the scattered light signals 30' of the range imaging LIDAR system 24' can be used to directly measure velocity, true airspeed, vertical speed, angle of attack, angle of sideslip, static density, static temperature, and aerosol to total scattering ratio (ASR). From these data products the following quantities can be directly calculated: calibrated airspeed, Mach number, static pressure, total pressure, dynamic pressure, pressure altitude, air density ratio, total temperature, angle of attack, pressure differential, and angle-of-sideslip pressure differential. Wind velocity, density, and temperature are directly calculated using the fringe data from the Fabry-Pérot interferometer 31. The other air data products are derived from these three basic measurements, in view of the knowledge of the associated geometry of the beam steering optics. The molecular signal yields a measure of air density that can be related to pressure. The aerosol to total scattering ratio is also directly derived from the results.

As used herein, the term relative wind is intended to refer to the relative motion between the atmosphere—included molecules and aerosols—and the range imaging LIDAR system 24'. In addition to frequency—which, responsive to associated Doppler shift, provides for measuring associated velocity—the algorithm determines the contribution to the fringe pattern from molecular and aerosol scatter, the background radiation, and the temperature of the atmosphere 20 for each particular associated direction associated with each corresponding volumetric element 52 as viewed by the associated receive optics 32. Further detail on the measuring of molecular and aerosol scatter may be found in U.S. National Stage application Ser. No. 13/387,553, the immediate parent of this application.

In previous embodiments such as those disclosed in U.S. National Stage application Ser. No. 13/387,553, the immediate parent of this application, as well as other related patents and applications, the aerosol and molecular components of the wind velocity have been combined into a single measurement. For those instances where the aerosol particles are very small, the aerosol and molecular velocity will be the same, and one can take advantage of the improved measurement precision available by combining the measurement of the molecular and aerosol components. However, there are cases where one would like to be able to separate the aerosol and molecular velocity components. For example, precipitation such as snowflakes and rain drops are large aerosols, and because they are generally falling, they often have a different velocity than the surrounding air molecules.

In the case of a wind turbine, it is the air molecules that provide the energy to spin the turbine, and if one were to use the velocity of the rain drops, one could find that the output from the turbine is significantly different than that predicted from the aerosol velocity measurement. A direct detection LIDAR such as those described in U.S. Pat. No. 7,106,447, U.S. Pat. No. 7,495,774, U.S. Pat. No. 7,505,145, U.S. Pat. No. 7,508,528, U.S. Pat. No. 7,518,736, and U.S. Pat. No.

7,522,291 and patent application WO 2011/016892 A2 can measure either or both components depending upon the signal processing method.

Figure 7A:
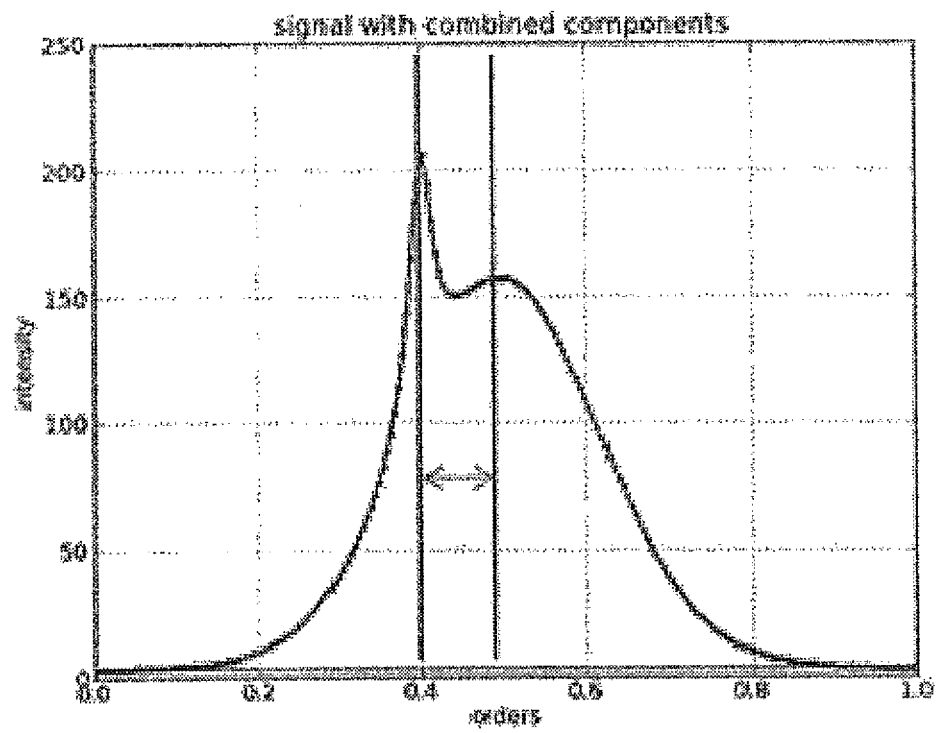
FIG. 7a illustrates an example fringe image containing the combination of separately shifted aerosol and molecular signals.
Figure 7B:
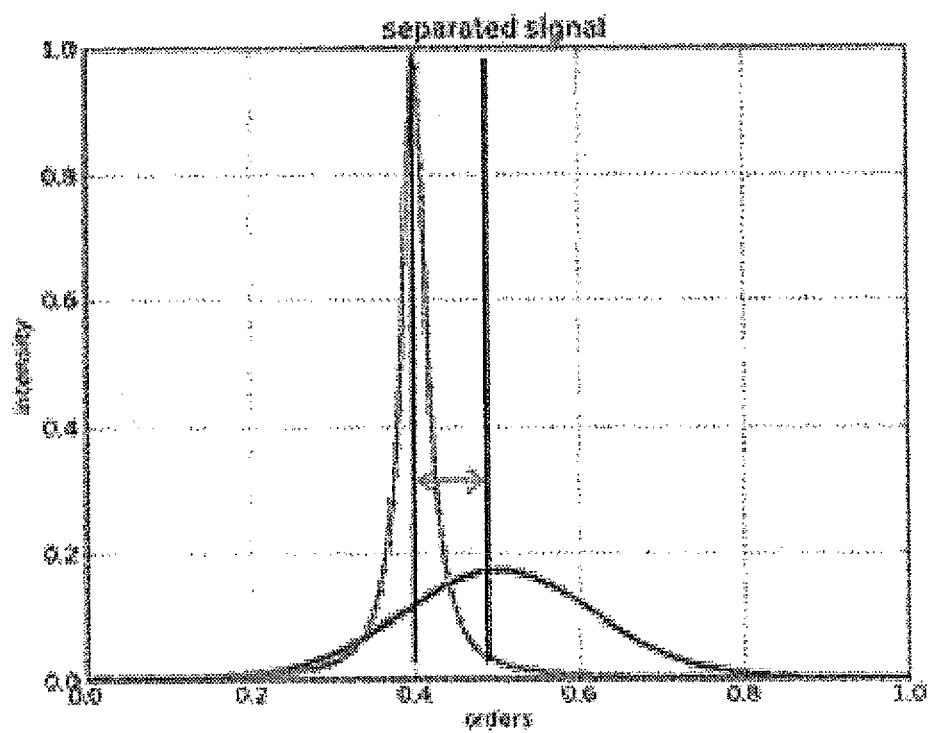
FIG. 7b illustrates an example fringe image decomposed against constituent basis functions.

Separating the measurement of the aerosol and molecular velocities is derived from the fringe image generated by the atmospheric measurement system 10 that is the superposition of the molecular response and the aerosol response. In the case of the aerosols moving independently of the bulk flow (molecules), the Doppler shift will not be shared as shown in FIGS. 7a-7b. FIG. 7a illustrates an example fringe image containing the combination of separately shifted aerosol and molecular signal and FIG. 7b illustrates an example fringe image decomposed against constituent basis functions. The vertical lines demonstrate the independent Doppler shifts of the aerosol and molecular signals. As such, two velocities in the response must be accounted for simultaneously.

These two velocities, $u_A$ $u_M$, may be easily recovered with a simple extension of the method disclosed in the parent '533 application, by simply adding a dependent velocity per model function:

$$I(\varphi) = C_A \psi_A\left(\varphi - 2M_0 \frac{u_A}{c}\right) + C_M \psi_M\left(\varphi - 2M_0 \frac{u_M}{c}, T\right)$$

Where:
$C_A$ is the total aerosol signal intensity
$\psi_A$ is the Fabry-Perot aerosol response
$C_M$ is the total molecular intensity
$\psi_M$ is the Fabry Perot molecular response
$\varphi$ is the order
T is the temperature
$M_0$ is the maximum order of the Etalon Standard non-linear least squares solution techniques such as those described in the above-referenced patent(s) and patent application may be used in solving the above-noted equation. In most cases, it is advantageous to estimate the wind velocity using inputs from both the aerosol and molecular components. Combining the measurements when the aerosol and molecular components have nearly the same velocity improves measurement precision. When to or not to combine the aerosol and molecular components into a single measurement can be decided statistically.

In the process of estimating the aerosol and molecular velocity, the uncertainty can also be calculated. Measurement uncertainty can be used to establish a probability that the two measurements correspond to a high enough degree to make combining the measurements reasonable. For example, if the difference between the mean aerosol and molecular velocities is less than ¼ the combined aerosol and molecular 1 sigma uncertainty, the measurements are considered to be measuring the same thing and measurements would be combined. On the other hand, if the difference in mean aerosol to molecular velocities was 4 times the combined 1 sigma uncertainty, the measurements indicate that the same things are not being measured, and the measurements would be reported separately.

The threshold for deciding when to combine the measurements would be based on what the system designer establishes as a reasonable and safe operating scenario. One skilled in the art would be able to determine the acceptability of over or under estimating the wind speed when compared of improving the measurement precision. Establishing a threshold for combining or separating measurements, will depend upon the characteristics of the wind turbine and how the data is being used to control or monitor the wind turbine.

Figure 7C:
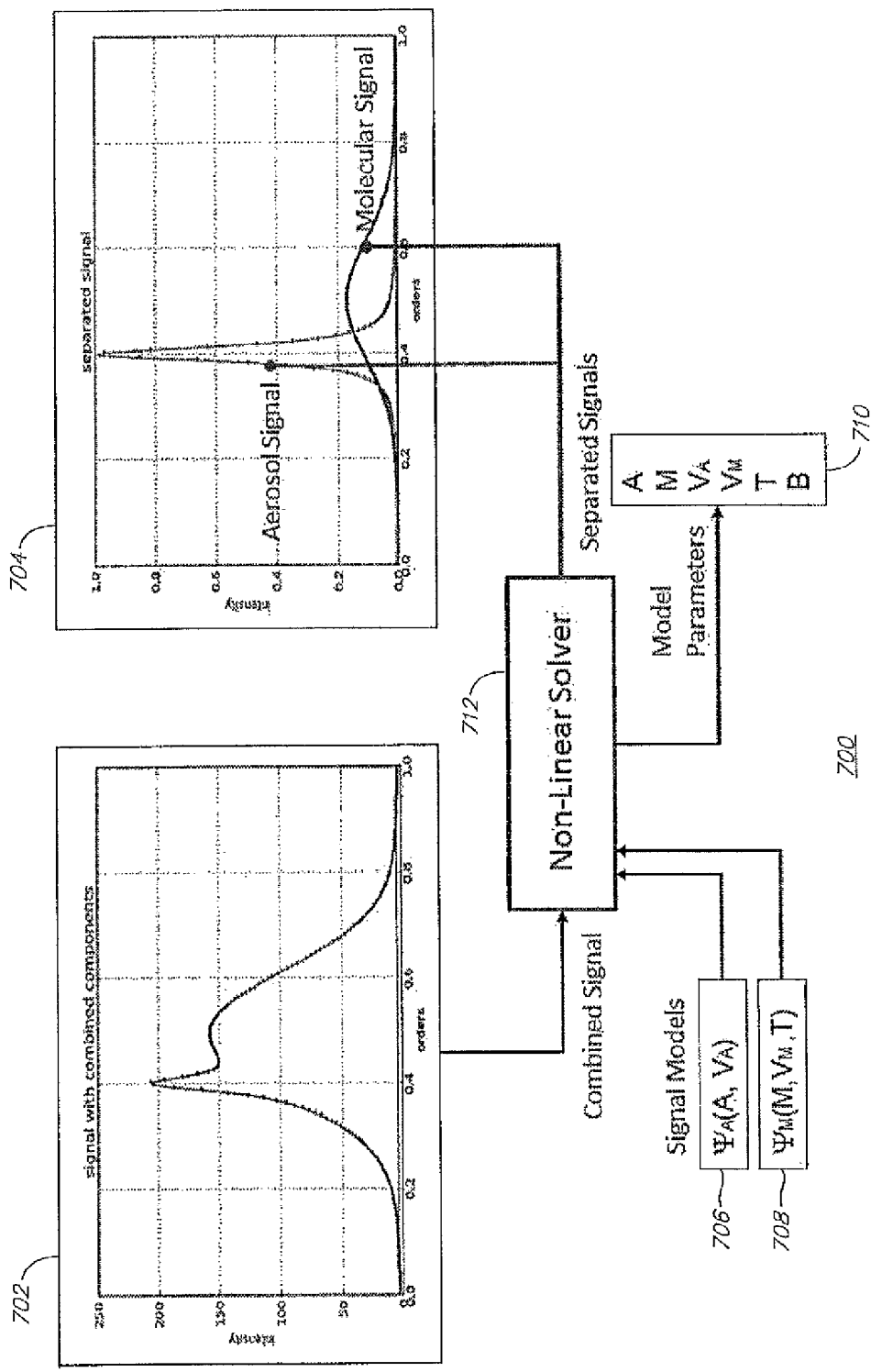
FIG. 7c illustrates the methodology to generate the aerosol and molecular response signals separately or as a combined signal.

FIG. 7c illustrates a general methodology 700 implementable by software for either separating or combining the measurements. In effect, to either derive the combined plot 702 of the aerosol and molecular components or to generate the separate plots 704 of the aerosol and molecular components, signal models 706,708 of the aerosol and molecular components and/or model parameters 710 are applied to a non-linear solver 712. As shown, the signal model 706 for the aerosol component is $\psi_A$ representing the Fabry Perot aerosol response, and the signal model 708 for the molecular component is $\psi_M$ representing the Fabry Perot molecular response. Amongst the model parameters 710, the parameter A represents the aerosol signal level, M represents the molecular signal level, $V_A$ is the velocity of the aerosol component, $V_M$ is the velocity of the molecular component, T is the temperature of the air, and B is the background temperature. Further detail on determining the molecular and aerosol components may be found in U.S. National Stage application Ser. No. 13/387,553, the immediate parent of this application.

Figure 8:
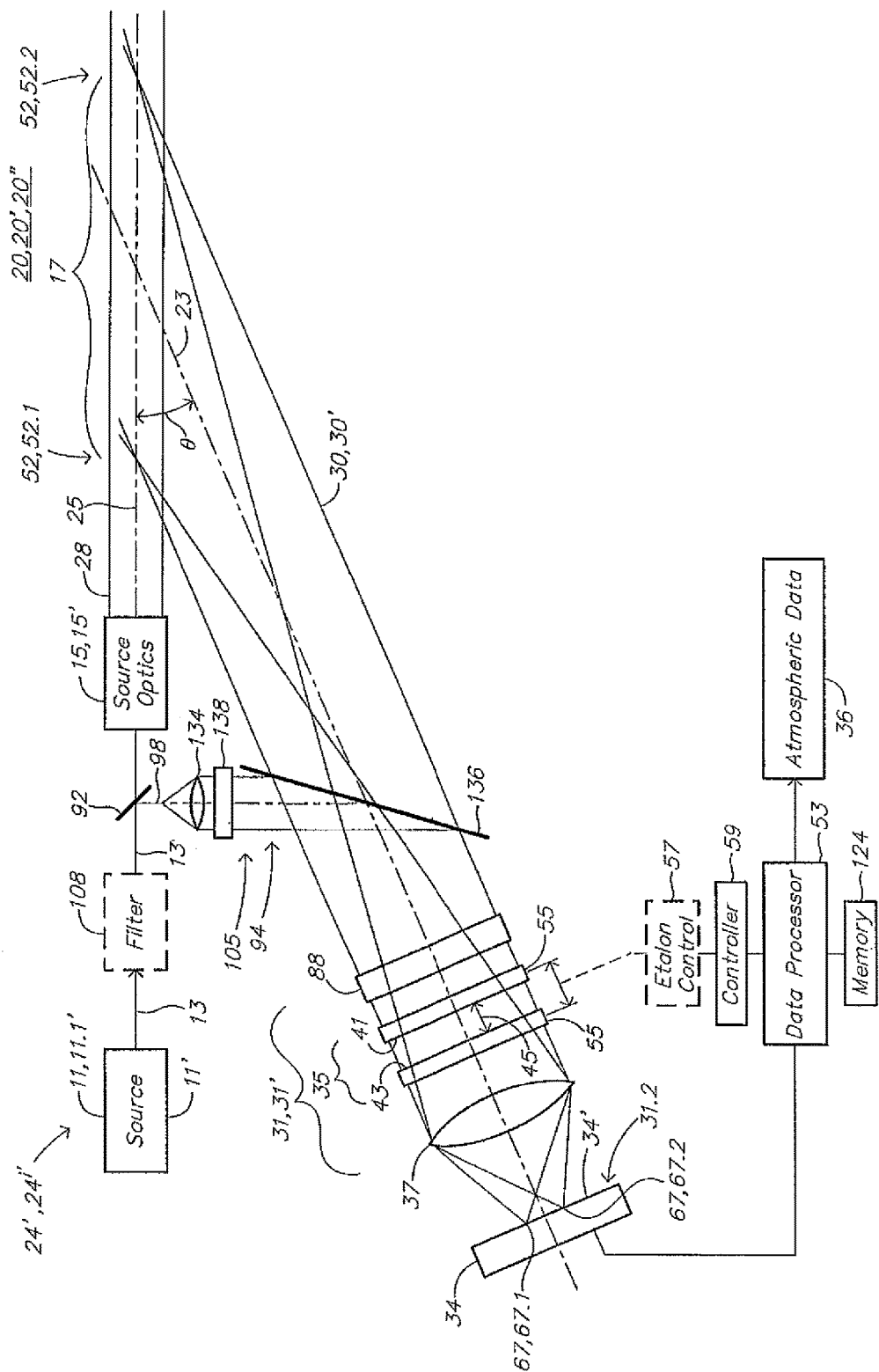
FIG. 8 illustrates a second embodiment of the first aspect of the range imaging LIDAR system, incorporating a Fabry-Pérot interferometer without an associated collimating lens.

Referring to FIG. 8, the range imaging LIDAR system 24', 24$^{ii}$ may be built without the collimating lens 33 and input telescope 32'. With the detector 34' of the detection system 34 located in the output focal plane 31.2 of the imaging optics 37—which is where the circular fringes produced by the Fabry-Pérot etalon 35 are sharpest—when the scattered light signal 30' is relatively close to the sensor, the resulting image of a scatter fringe pattern may be out of focus, but the pertinent information is still present in the image. The geometry between the source beam of light 28 and the field-of-view 54 of the receive optics 32 is essentially the same as the system with the input telescope 32' and collimating lens 33.

A reference beam portion 90 of the substantially monochromatic light 13 from the light source 11 is reflected from a first beam splitter optic 92 so as to generate an associated reference source 94 which is coupled into an associated fiber optic 98 that routes the signal to where it is needed. The output from the fiber optic 98 is divergent and is subsequently collimated by an associated lens 134 and then combined with the scattered light 30 using a second beam splitter optic 136 that reflects a relatively small portion of the substantially monochromatic light 13 from the reference source 94 into the Fabry-Pérot interferometer 31 as the associated reference light signal 105 while transmitting a substantial portion of the scattered light 30 therethrough into the Fabry-Pérot interferometer 31 as the scattered light signal 30'.

The position of the fiber optic 98 in the image plane of the lens 134 determines where the associated image 114 of the reference light signal 105 will appear on the detection system 34. In one embodiment, the image 114 of the reference light signal 105 is positioned so as to not overlap the associated scattered light signal 30' in the output focal plane 31.2 of the Fabry-Pérot interferometer 31. In another embodiment, in accordance with the eighth aspect of the range imaging LIDAR system 24', 24$^{viii}$ described more fully herein below, the image 114 of the reference light signal 105 is positioned so as to overlap the associated scattered light signal 30', with the portion of the reference light signal 105 overlapping the scattered light signal 30' blocked by an associated mask 138 between the lens 134 and the second beam splitter optic 136.

The associated optics can be designed so that the reference light signal 105 will be sufficient to determine the center of the interference pattern produced by the Fabry-Pérot interferometer 31 as well as the location of the associated arcuate fringes 49', 49".

Figure 9:
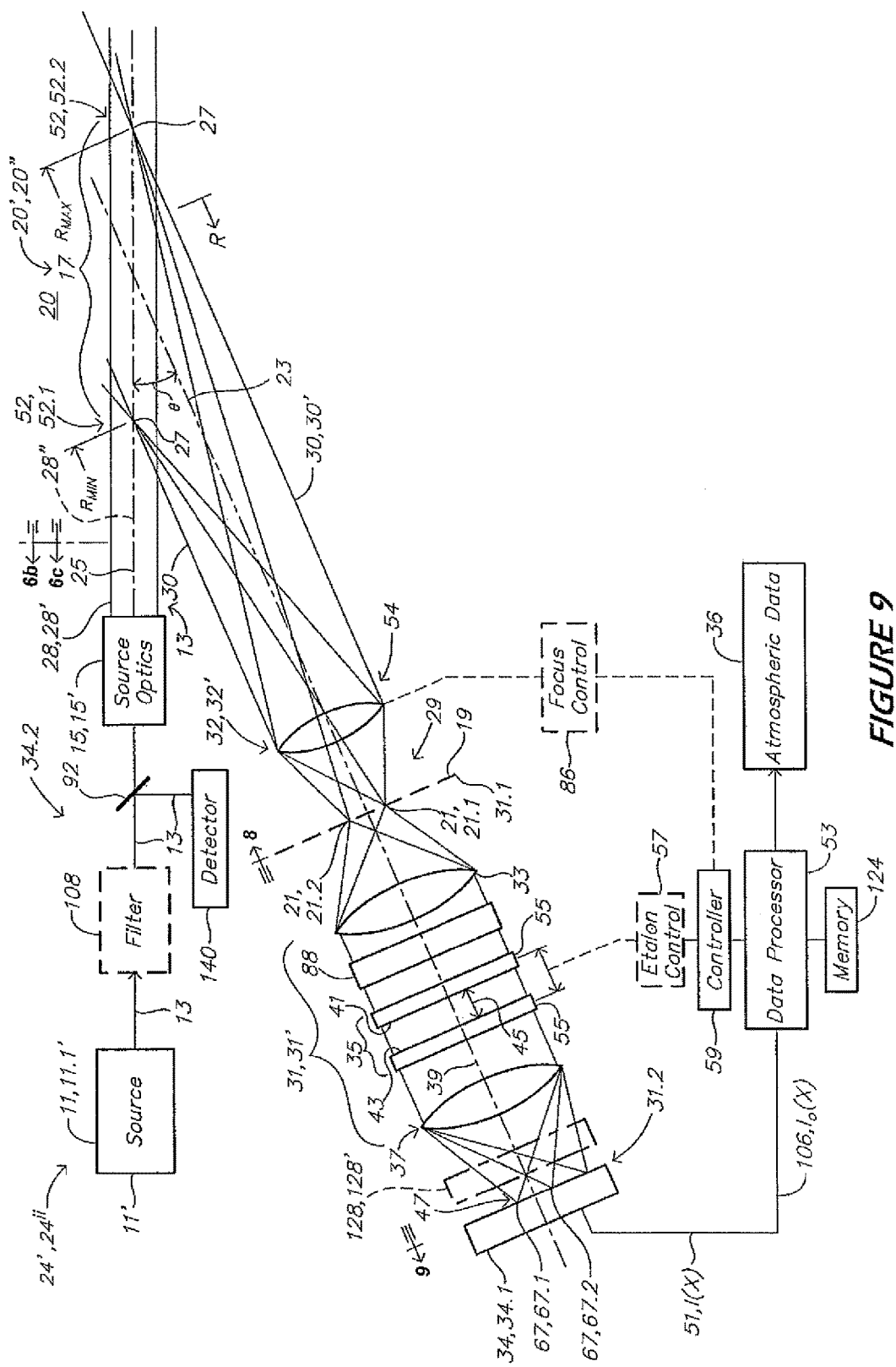
FIG. 9 illustrates an embodiment of range imaging LIDAR system incorporating an associated detection system, suitable for determining atmospheric measurements that are not dependent upon relative wind velocity.

Referring to FIG. 9, the range imaging LIDAR system 24', 24$^{ii}$ may be adapted in accordance with an associated detection system 34.2 to measure the overall intensity of the reference source 94 with a detector 140, rather than processing the reference beam through the Fabry-Pérot interferometer 31, for example, so as to provide for either reducing the total number of signals processed with the Fabry-Pérot interferometer 31. Such an arrangement would be suitable when the associated atmospheric data 36 being measured therewith are not dependent upon relative wind velocity, the latter of which measure is calibrated responsive to a measure of frequency shift of the reference light signal 105 using the Fabry-Pérot interferometer 31. For example, the range imaging LIDAR system 24', 24$^{ii}$ illustrated in FIG. 9 would be suitable for measuring either or both of static density $\rho$ and static temperature $T_S$, or to provide for deriving therefrom one or more of static air pressure, total air temperature, speed of sound, air density ratio or pressure altitude.

Figures 10A, 10B:
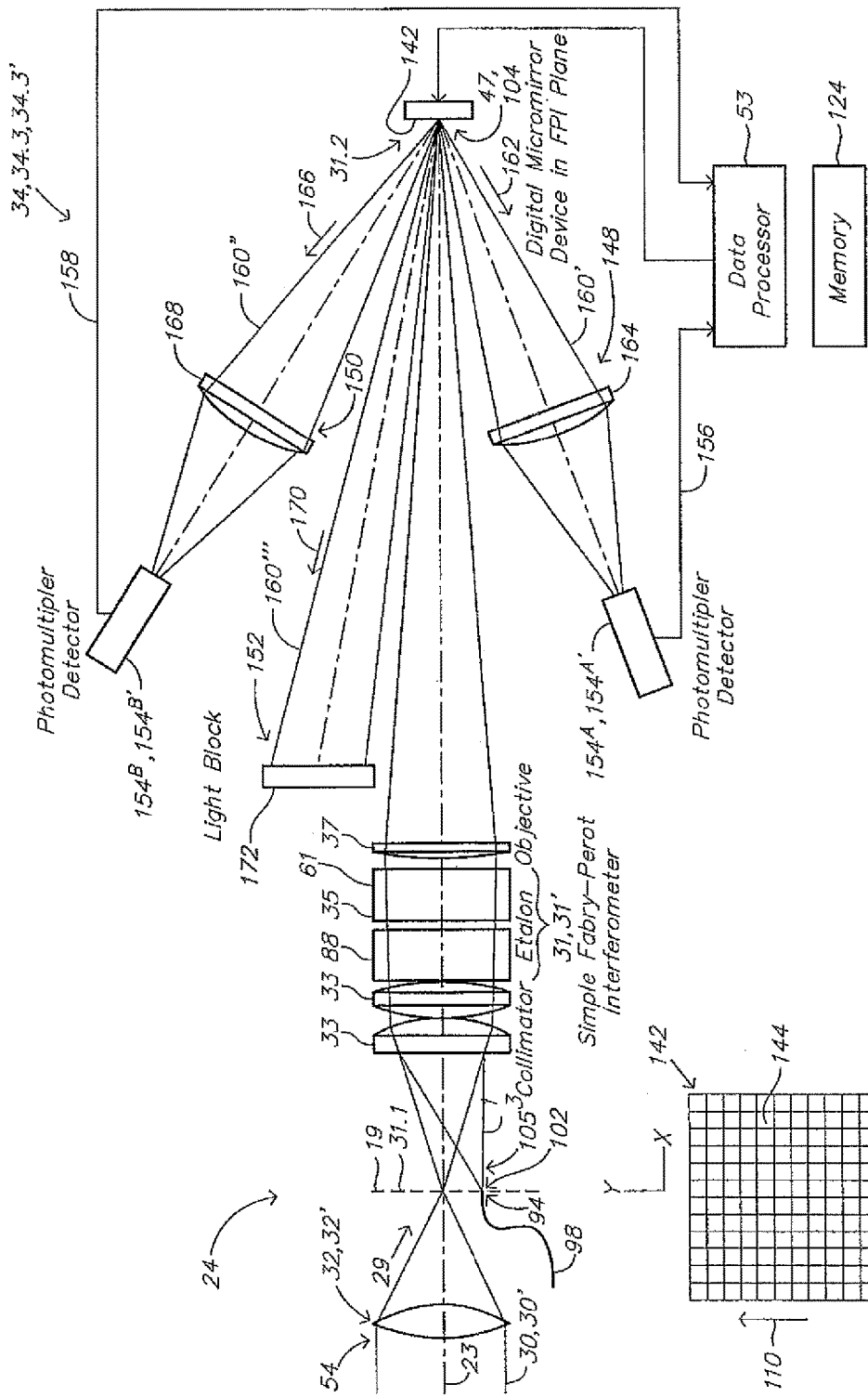

Referring to FIGS. 10a and 10b, an associated detection system 34.3, 34.3' of a range imaging LIDAR system 24' incorporates a digital micro mirror device (DMD) 142 comprising an array—for example, a Cartesian array of N rows and M columns—of associated micro mirrors 144, each of which constitutes a controllable pixel that is individually addressable and controllable to one of at least three possible associated pixel mirror rotational states 148, 150, 152. The digital micro mirror device (DMD) 142 is located in the output focal plane 31.2 of the imaging optics 37 of the Fabry-Pérot interferometer 31 so as to receive the scatter 47 and reference 104 fringe patterns processed by the Fabry-Pérot interferometer 31, portions of which, when processed, are selectively reflected onto a pair of photodetectors 154$^A$, 154$^B$, for example, photomultiplier detectors 154$^{A'}$, 154$^{B'}$ from which complementary signals 156, 158 detected thereby are processed by the data processor 53 so as to provide for determining the associated measures of the atmosphere 20 therefrom as a function of nominal range R.

The micro mirrors 144 of the associated array of micro mirrors 144 of the digital micro mirror device (DMD) 142 in the first pixel mirror rotational state 148 cause first portions 160' of either the scatter fringe pattern 47 or the reference fringe pattern 104 from the Fabry-Pérot interferometer 31 impinging thereupon to be reflected in a first direction 162 to an associated first objective lens 164, and to be directed thereby to the a first photomultiplier detector 154$^{A'}$. Similarly, micro mirrors 144 of the associated array of micro mirrors 144 of the digital micro mirror device (DMD) 142 in the second pixel mirror rotational state 150 cause second portions 160" of either the scatter fringe pattern 47 or the reference fringe pattern 104 from the Fabry-Pérot interferometer 31 impinging thereupon to be reflected in a second direction 166 to an associated second objective lens 168, and to be directed thereby to the a second photomultiplier detector 154$^{B'}$. Finally, micro mirrors 144 of the associated array of micro mirrors 144 of the digital micro mirror device (DMD) 142 in the third pixel mirror rotational state 152 cause third portions 160''' of either the scatter fringe pattern 47 or the reference fringe pattern 104 from the Fabry-Pérot interferometer 31 impinging thereupon to be reflected in a third direction 170 to the light block 172 that provides for absorbing light impinging thereupon. For example, in one embodiment, the third pixel mirror rotational state 152 corresponds to a state of substantially no rotation of the associated micro mirrors 144, which may be achieved, for example, by applying a common voltage to the associated micro mirror 144 and it associated mirror address electrodes and yoke address electrodes, so as to create an equal state of electrostatic repulsion between all associated pairs of electrodes associated with the micro mirror 144, thereby maintaining the micro mirror 144 in a substantially unrotated condition.

The micro mirrors 144 of the digital micro mirror device (DMD) 142 are relatively efficient, with overall efficiency approaching 90% in one set of embodiments. Accordingly, the digital micro mirror device (DMD) 142 provides for digitally isolating light impinging thereupon into two disjoint sets for the portion of the light being analyzed, and for masking a remaining portion of the light. More particularly, the digital micro mirror device (DMD) 142 is used to interrogate portions the scatter 47 and reference 104 fringe patterns from the Fabry-Pérot interferometer 31, and in cooperation with the associated first 154$^{A'}$ and second 154$^{B'}$ photomultiplier detectors, to provide for generating associated one or more pairs of associated complementary signals 156, 158, each responsive to the number of photons in the associated two disjoint sets of light reflected by the digital micro mirror device (DMD) 142 resulting from a particular pattern of pixel mirror rotational states to which the associated array of micro mirrors 144 of the digital micro mirror device (DMD) 142 are set for a particular set of measurements, wherein the associated first 154$^{A'}$ and second 154$^{B'}$ photomultiplier detectors provide for counting the corresponding number of photons associated with each of the disjoint sets of light reflected by the digital micro mirror device (DMD) 142.

For further details on the structure and operation of the digital micro mirror device (DMD), one can refer to the disclosures of U.S. Pat. No. 5,535,047, and the publication entitled "The Digital Micro mirror Device: A Historic Mechanical Engineering Landmark", published by Texas Instruments Inc. and the American Society of Mechanical Engineers on 1 May 2008 with 20 pages, both of which references are incorporated herein by reference.

Accordingly, the range imaging LIDAR system 24' uses the Fabry-Pérot interferometer 31 to directly detect information from the scattered laser energy, wherein the scatter 30' and reference 105 light signals are each detected separately, and information from the reference light signal 105 can then be used to calibrate the associated scattered light signal 30'. The detection process is responsive to an incoherent Doppler shift of the laser light scattered by molecules and aerosols in the atmosphere 20 responsive to Rayleigh and Mie scattering respectively. The response of a Fabry-Pérot interferometer 31 is well documented in the literature, for example, as described by P. B. Hays and R. G. Roble in "*A Technique for Recovering Doppler Line Profiles from Fabry-Perot Interferometer Fringes of very Low Intensity*", Applied Optics, 10, 193-200, 1971, which is incorporated herein by reference.

One advantage of the range imaging LIDAR system 24' is that the associated ring or pattern parameters can be reconfigured rapidly. The micro mirrors 144 of the digital micro mirror device (DMD) 142 can be reconfigured in about 10 microseconds. This allows the instrument to adapt as the environment changes. One other advantage of this type of system is that there is no read noise from the pixels like there is with an imaging photodetector such as a CCD. The only noise is from the first 154$^{A'}$ and second 154$^{B'}$ photomultiplier detectors which when cooled produces very low background signals. Also, the range imaging LIDAR system 24' uses the molecular response as well as the strong aerosol response which has a very high signal to noise ratio and effectively reduces the system error due to noise; the range imaging LIDAR system 24' can account for and exploit the known effects due to thermal broadening; the range imaging LIDAR system 24' can simultaneously measure velocity, temperature, aerosol and molecular components, and the range imaging LIDAR system 24' can adapt to the changing environment in order to always produce measurements based on the highest sensitivity.

However, this is subject to several limitations, the first being the relatively low quantum efficiency of the first 154$^{A'}$ and second 154$^{B'}$ photomultiplier detectors and the second being the fact that only two of the patterns of pixel mirror rotational states 148, 150, 152 or "ring sets" are being monitored at any given time. However, there is need to cycle amongst all of the patterns of pixel mirror rotational states 148, 150, 152 with equal temporal resolution. The knowledge of aerosol content might only be required infrequently to provide a reasonable measurement of the Ratio parameter. Temperature is not always required and again could be provided only at infrequent intervals. Accordingly, the basic advantage of the edge type of detection can be achieved with the range imaging LIDAR system 24', and most of the limitations associated with the simple edge detection can be eliminated.

The range imaging LIDAR system 24' can be employed utilized for any optical remote sensing scenario. Every remote sensing problem is solved by fitting a model for the system response to the data observed while accounting for the expected deviations in the data. In a Fabry-Pérot interferometer 31 system this response is a collection of fringes for which exists a wealth of phenomenological models. The range imaging LIDAR system 24' incorporates a digital micro mirror device (DMD) 142 in cooperation with a Fabry-Pérot interferometer 31 to segment the optical response between two fast photodetectors. These segmented measurements are made using patterns of pixel mirror rotational states 148, 150, 152 based on the derivatives of the model with respect to each parameter to be estimated thereby granting the highest sensitivity possible. An optimization with respect to segmentation thresholds and timing exposure resolution is performed to minimize the covariance of the minimum variance unbiased estimator of the system. Cost functions based on this covariance may be formed to allow trade-offs to be computed automatically with nonlinear optimization techniques such as BFGS or the Nelder-Mead Simplex algorithm. The ability to use fast photodetectors allows one to apply the range imaging LIDAR system 24' to problems where one wishes to measure state variable with a fine spatial resolution.

Figure 11:
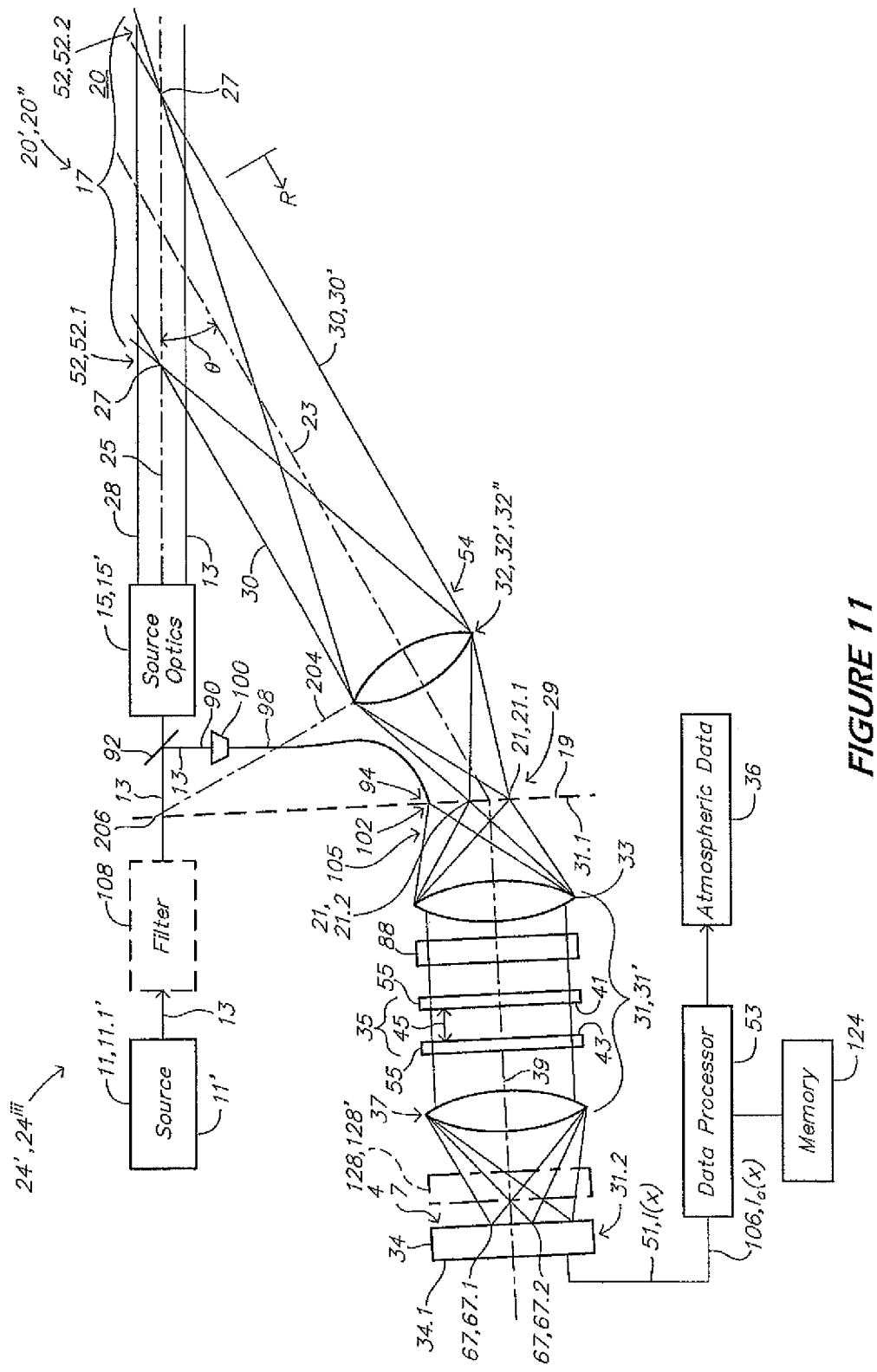
FIG. 11 illustrates another embodiment of a range imaging LIDAR system.

Referring to FIG. 11, in the range imaging LIDAR system 24', 24$^{iii}$, the near-range blur in the intermediate image 29 can be reduced by orienting the Fabry-Pérot interferometer 31, and particularly, the collimating lens 48 thereof, in relation to the receive optics 32 so that the intermediate image plane 19 satisfies the Scheimpflug condition, whereby the optic axis 25 of the beam of light 28, the plane 204 of the effective lens 32" of the receive optics 32 and the intermediate image plane 19 all interest at a common point of intersection 206, also known as a Scheimpflug intersection. Reducing the blur in the intermediate image 29 provides for reducing the breadth of the scatter fringe pattern 47 in the Y-direction 110 in the output focal plane 31.2, thereby simplifying the requirements of the associated detection system 34, for example, so as to enable the use of a linear photodetector array or a linear array of photodetectors.

Figure 12:
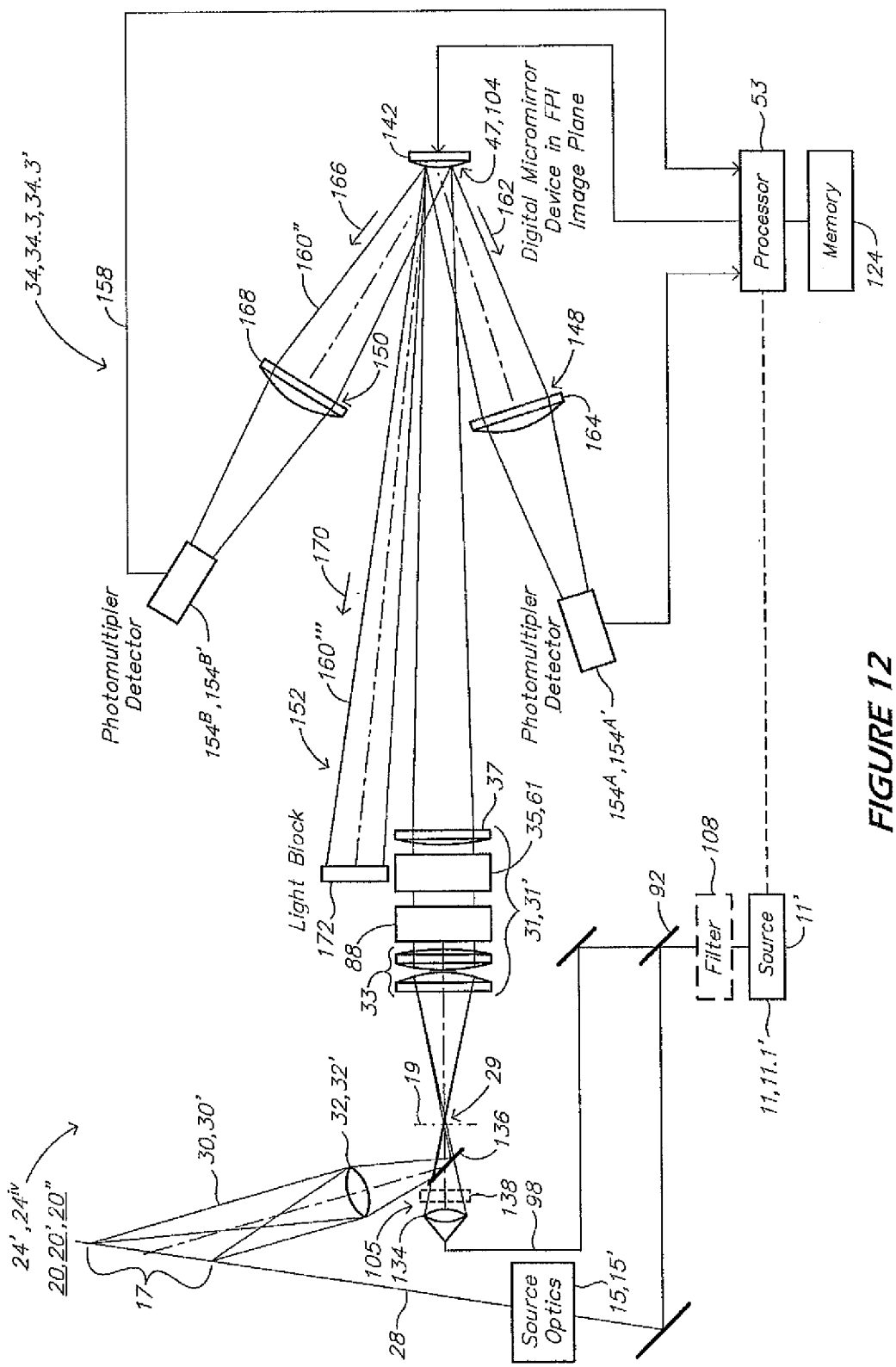
FIG. 12 illustrates another embodiment of range imaging LIDAR system.

Referring to FIG. 12, a range imaging LIDAR system 24', 24$^{iv}$ incorporates a collimating lens 33 in cooperation with the Fabry-Pérot interferometer 31, an input telescope 32' for receiving the scattered light 30, and with the scattered light 30 and reference source 98 juxtaposed relative to the associated second beam splitter optic 136. A substantial portion of the scattered light 30 is reflected from the second beam splitter optic 136, and the reference light signal 105 from the reference source 98 is transmitted through the second beam splitter optic 136, wherein the reference source 98 is embodied substantially the same as illustrated and described in accordance with the second embodiment of the first aspect of the range imaging LIDAR system 24', 24$^{ii}$.

In another embodiment (not shown), the image of the reference light signal 105 is positioned so as to not overlap the associated scattered light signal 30 in the output focal plane of the Fabry-Pérot interferometer 31. In a further embodiment (not shown) of the range imaging LIDAR system 24, an image of the reference light signal 105 is positioned so as to overlap the associated scattered light signal 30, with the portion of the reference light signal 105 overlapping the scattered light signal 30 blocked by an associated mask 138 between the lens 134 and the second beam splitter optic 136. In yet another embodiment (not shown), the light source 11 is pulsed, for example, a pulsed Nd:YAG laser and the associated detection system 34—for example, using a fast DMD detection system instead of the relatively slower CCD-based detection system—is sampled in synchronism with the light source 11 so as to provide for initially capturing the reference light signal 105 prior to receiving the scattered light signal 30, and to then receive the process the scattered light signal 30 thereafter.

Figure 13:
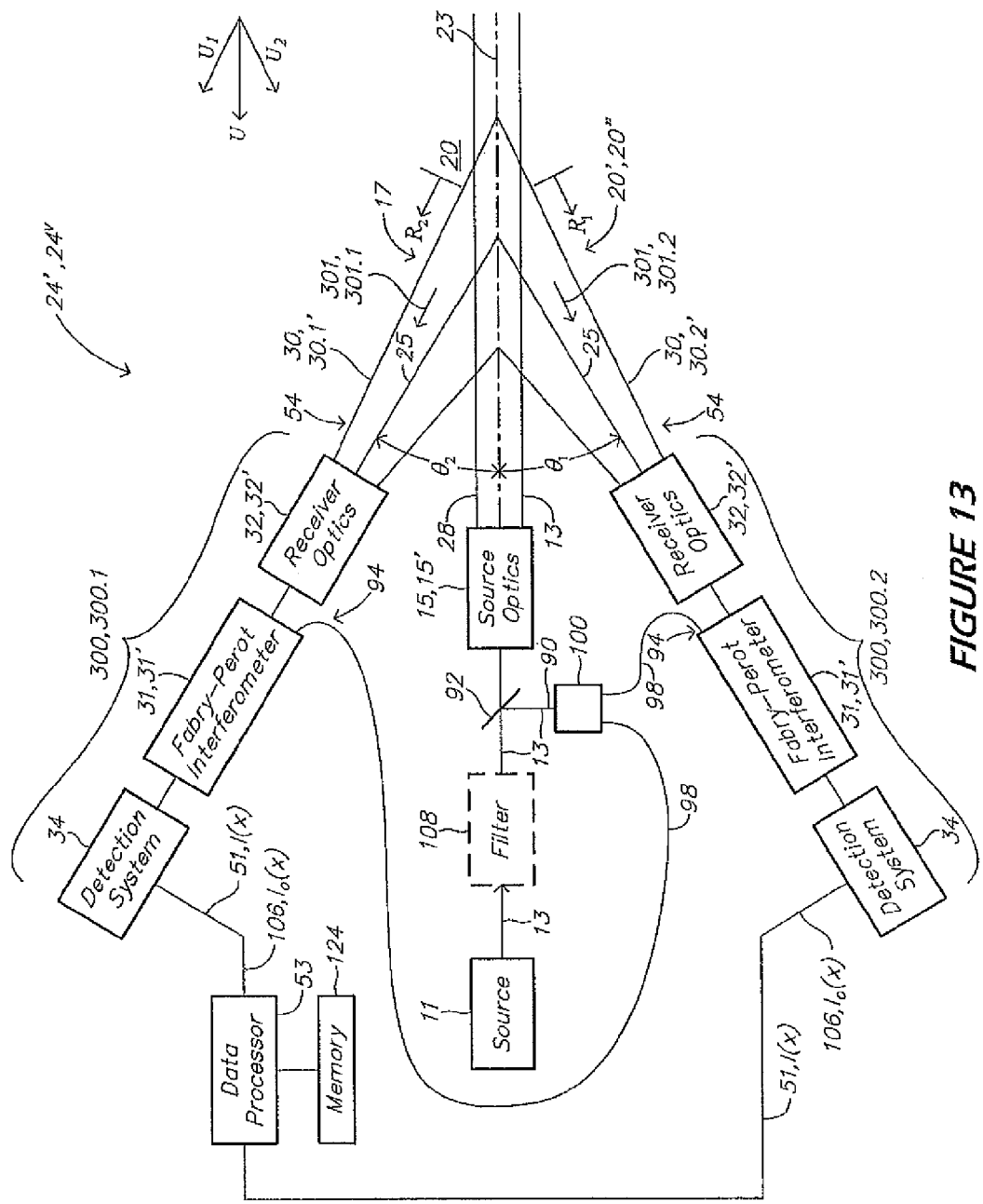
FIG. 13 illustrates a further embodiment of a range imaging LIDAR system.

Referring to FIG. 13, a plurality of separate receivers 300, 300.1, 300.2 are adapted to cooperate with a common beam of light 28, wherein each receiver 300, 300.1, 300.2 comprises an associated combination of receive optics 32, a Fabry-Pérot interferometer 31 and a detection system 34 constructed and operated in accordance with any of the above-described aspects of the range imaging LIDAR systems 24' described hereinabove, wherein the reference source 94 associated with each receiver 300, 300.1, 300.2 is obtained from a common beam of light 28. The scatter 51 and reference 106 electronic image signals from the receivers 300, 300.1, 300.2 are separately processed by the data processor 53 in accordance with any of the above-described aspects of the range imaging LIDAR systems 24' described hereinabove, so as to provide for generating a set of one or more measures of aerosol counts A, molecular counts M, velocity u, temperature t, and background counts B at one or more selected nominal ranges R, or as a function of nominal range R, for each of the receivers 300, 300.1, 300.2. More particularly, in one embodiment, separate measures of velocity u, $u_1$, $u_2$ at one or more selected nominal ranges R, or as a function of nominal range R, are generated for each receiver 300, 300.1, 300.2, wherein the associated Doppler shift to the frequency of the common beam of light 28 is dependent upon the velocity u of the atmosphere 20 in the direction 301, 301.1, 301.2 of the receiver 300, 300.1, 300.2. The separate measures of velocity u, $u_1$, $u_2$ in combination then provide for determining a measure of a velocity vector U at one or more selected nominal ranges R, or as a function of nominal range R, so as to provide for determining a velocity field within the atmosphere 20. For example, the fifth aspect of a range imaging LIDAR system 24', 24$^{v}$ could be used in a wind tunnel to provide for probing the velocity field of the flow field therein without perturbing that flow field.

Figure 14:
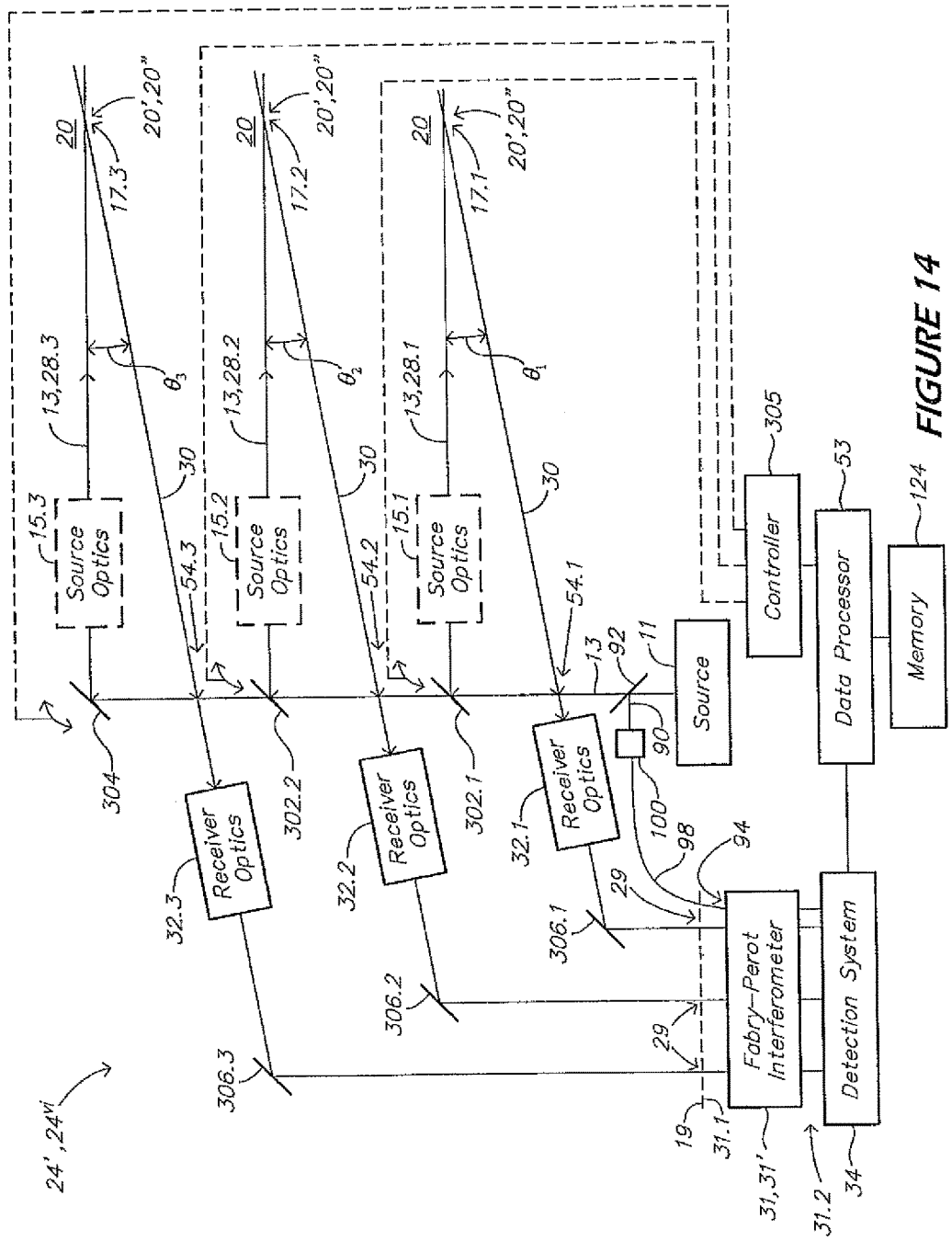
FIG. 14 illustrates an even further embodiment of a range imaging LIDAR system.

Referring to FIG. 14, a plurality of beams of light 28, 28.1, 28.2, 28.3 are generated from a common light source 11 that is distributed thereto by a corresponding set of beam splitters 302.1, 302.2 and a mirror 304. For example, different beams of light 28, 28.1, 28.2, 28.3 may be directed in different directions or at different locations into the atmosphere 20, for example, so as to provide for either probing different portions of the atmosphere, or so as to provide for a velocity vector U of the range imaging LIDAR system 24', 24$^{vi}$ relative to the atmosphere 20, for example, with the range imaging LIDAR system 24', 24$^{vi}$ used as an optical air data system in a vehicle, for example, an aircraft. For example, in one set of embodiments, the attitude or position of one or more of the beam splitters 302.1, 302.2 and mirror 304 may be controlled by a controller 305 operatively associated with or a part of the data processor 53 so as to provide for controlling the position or orientation of one or more of the associated beams of light 28, 28.1, 28.2, 28.3. In some embodiments, the range imaging LIDAR system 24', 24$^{vi}$ may incorporate one or more sets of source optics 15, 15.1, 15.2, 15.3 associated with one or more of the corresponding beams of light 28, 28.1, 28.2, 28.3 so as to provide for shaping the one or more beams of light 28, 28.1, 28.2, 28.3 and setting the size and divergence thereof. A plurality of receive optics 32, 32.1, 32.2, 32.3 are adapted to receive scattered light 30 from corresponding interaction regions 17, 17.1, 17.2, 17.3 of the one or more of the corresponding beams of light 28, 28.1, 28.2, 28.3 within the corresponding fields-of-view 54, 54.1, 54.2, 54.3 of the associated receive optics 32, 32.1, 32.2, 32.3, wherein each receive optics 32, 32.1, 32.2, 32.3 is oriented at a corresponding parallax angle θ, $θ_1$, $θ_2$, $θ_3$ with respect to the corresponding beam of light 28, 28.1, 28.2, 28.3, so that the associated interaction regions 17, 17.1, 17.2, 17.3 span a substantial range of nominal ranges R. Each set of receive optics 32, 32.1, 32.2, 32.3 is adapted to image the corresponding interaction region 17, 17.1, 17.2, 17.3 at different locations on a common intermediate image plane 19 that is located at the input focal plane 31.1 of a common Fabry-Pérot interferometer 31. For example, scattered light 30 from the receive optics 32, 32.1, 32.2, 32.3 is reflected onto the intermediate image plane 19 by an associated set of mirrors 306.1, 306.2, 306.3. Furthermore, a reference beam portion 90 of the substantially monochromatic light 13 is extracted from the light source 11 with a beam splitter optic 92 and then input as a reference source 94 at a location on the intermediate image plane 19 that is distinct from the locations of the intermediate images 29 from each of the receive optics 32, 32.1, 32.2, 32.3. The reference source 94 is processed by the Fabry-Pérot interferometer 31 to generate a corresponding reference fringe pattern, and the intermediate images 29 from each of the receive optics 32, 32.1, 32.2, 32.3 are processed by the Fabry-Pérot interferometer 31 to generate corresponding scatter fringe patterns.

Figure 15:
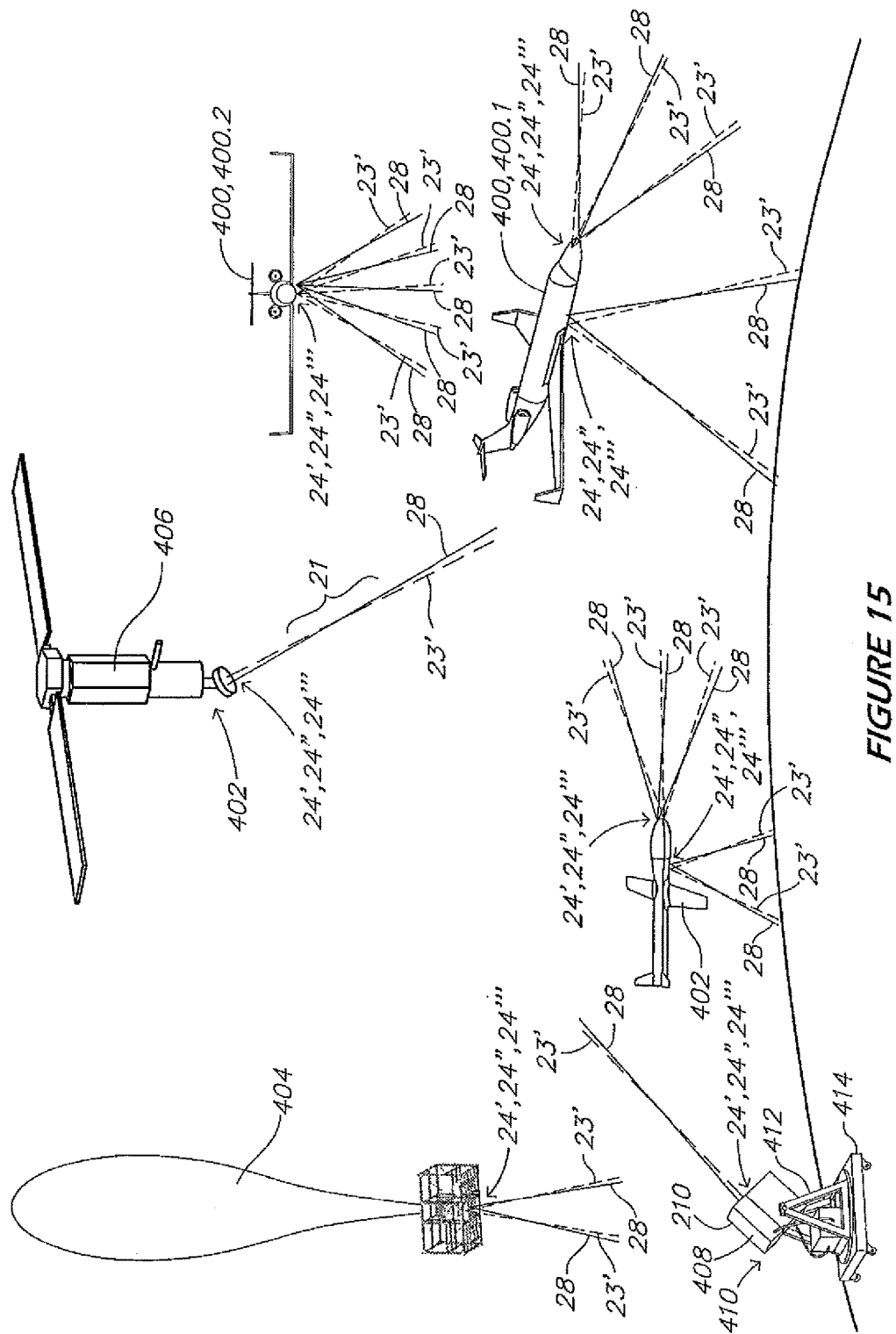
FIG. 15 illustrates various applications of a range imaging LIDAR system.

Referring to FIG. 15, the various aspects of the range imaging LIDAR system 24', 24$^{i}$-24$^{viii}$ can be used in a variety of applications, including flight control or flight data monitoring, for example, for an aircraft 400 or UAV 402; or monitoring atmospheric or weather conditions from an aircraft 400.1, 400.2, UAV 402, balloon 404, satellite 406, or ground-based LIDAR system 408.

For example, the aircraft 400, 400.1 and UAV 402 illustrated in FIG. 15 each incorporate a range imaging LIDAR system 24' that incorporates three lines of sight 23' so as to provide for measuring an associated relative wind vector in addition to other air data products, wherein each line of sight 23' is along the associated optic axis of the corresponding associated receive optics 32. Generally the range imaging LIDAR system 24' can be adapted for airframe applications which, for example, might otherwise incorporate a pitot-static tube for measuring air speed. In addition to air speed, the range imaging LIDAR system 24' provides for optically measuring, or calculating from optical measurements, a substantial quantity of air data products, and can be adapted to detect wind shear, wake vortices, clear air turbulence, and engine stall (unstart) conditions. Common air data products include, but are not limited to, Mach number, true airspeed, calibrated airspeed, vertical speed, static density, static air temperature, sideslip, angle of attack, pressure altitude, and dynamic pressure. The air data products can be used directly by an aircraft flight computer for flight control purposes. The range imaging LIDAR system 24' provides for an airframe-independent design that can be flush-mounted to the skin of the airframe, e.g. without protrusions that otherwise might increase the airframe's radar cross section and drag, so as to provide for relatively low observability and drag. The range imaging LIDAR system 24' can operate at substantial angles of attack. For example, a properly-configured range imaging LIDAR system 24' can operate at a 90 degree angle of attack. The range imaging LIDAR system 24' can be adapted to a variety of airframes, for example, including highly maneuverable aircraft and hoverable aircraft. The range imaging LIDAR system 24' provides for an airframe-independent design that can be relatively inexpensive to calibrate, recalibrate or service.

As another example, the aircraft 400, 400.1, 400.2, UAV 402, and balloon 404 illustrated in FIG. 15 each incorporate an range imaging LIDAR system 24' adapted with a plurality of lines of sight 23', so as to provide for substantially simultaneously measuring air data products from one or more interaction regions 17 along each of the associated lines of sight 23'. For example, the first aircraft 400.1 incorporates two lines of sight 23' distributed transversely with respect to the associated direction of travel thereof, and the second aircraft 400.2 incorporates five lines of sight 23' distributed transversely with respect to the associated direction of travel thereof, so as to provide for automatically acquiring a substantial amount of atmospheric data (e.g. density, temperature and wind velocity) that can be used for either monitoring or predicting weather, or for monitoring particular emissions into the atmosphere.

As yet another example, the satellite 406 and the ground-based LIDAR system 408 illustrated in FIG. 15 each incorporate an range imaging LIDAR system 24' adapted with a line of sight 23' that is directed respectively downwards or upwards into the atmosphere so as to provide for measuring air data products from one or more interaction regions 17 along each of the associated one or more lines of sight 23', for example, so as to provide for automatically acquiring a substantial amount of atmospheric data (e.g. density, temperature and wind velocity) that can be used for either monitoring or predicting weather, or for monitoring particular emissions into the atmosphere.

As yet another example, the ground-based LIDAR system 408 and associated range imaging LIDAR system 24' may be operatively associated with a gimbal mechanism 410 comprising an azimuthally-rotatable platform 412 which is adapted to pivotally support associated beam steering optics 210 so as to provide for an elevational rotation thereof relative a base 414 to which the azimuthally-rotatable platform 412 is operatively associated. Accordingly, the azimuthally-rotatable platform 412 is adapted to rotate relative to the base 414, for example, responsive to an associated motor drive system, so as to define an associated azimuth angle of the beam steering optics 210, and the beam steering optics 210 is adapted to rotate relative to the azimuthally-rotatable platform 412, for example, responsive to an associated motor drive system, so as to define an associated elevation angle of the beam steering optics 210.

Figure 16:
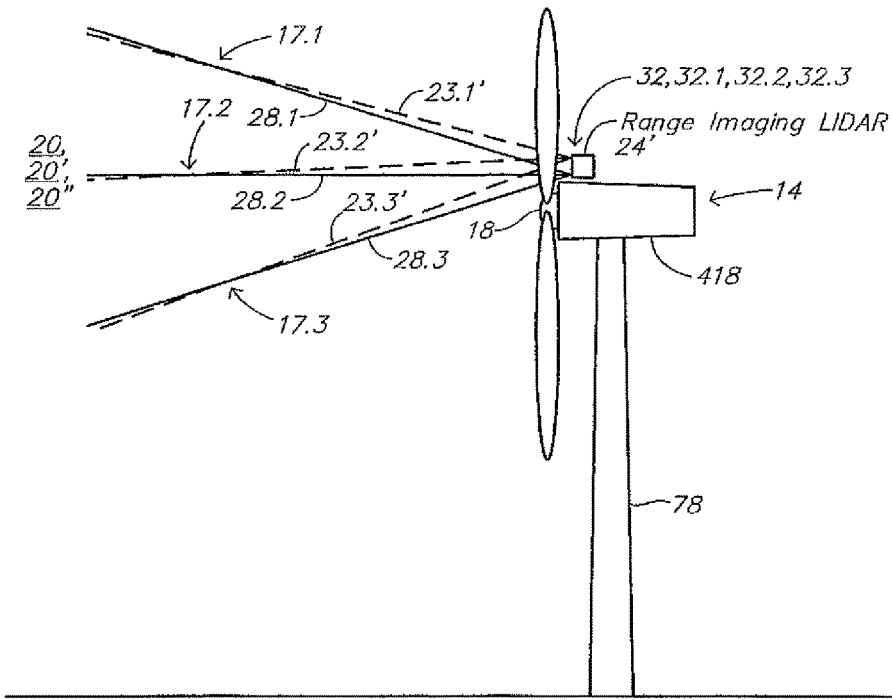
FIG. 16 illustrates an embodiment a range imaging LIDAR system in cooperation with a wind turbine.
Figure 17:
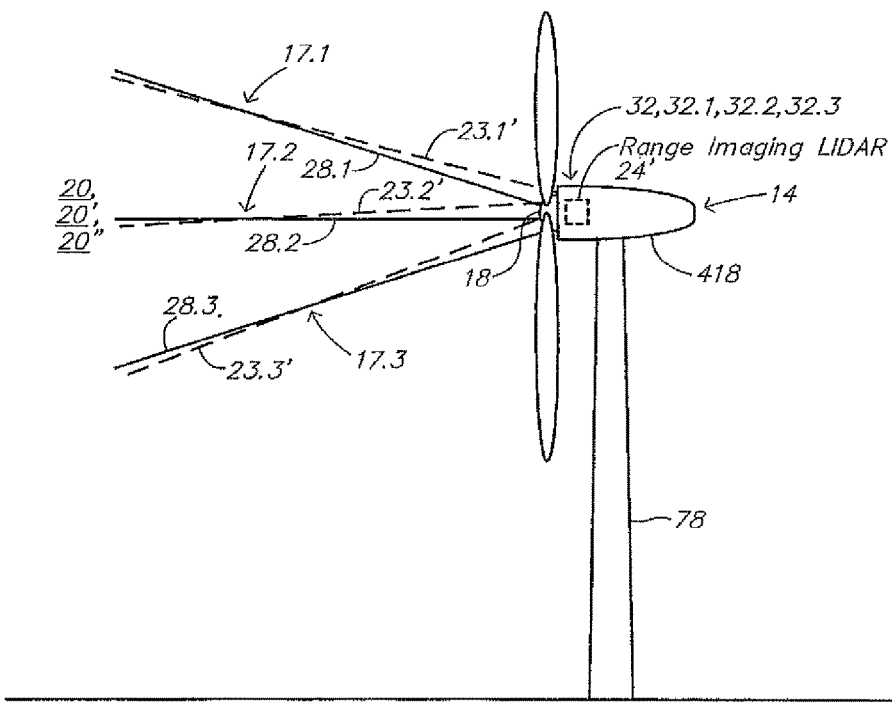
FIG. 17 illustrates another embodiment a range imaging LIDAR system in cooperation with a wind turbine.

Referring to FIGS. 16 and 17, a range imaging LIDAR system 24' in accordance with any of the above-described aspects is illustrated in cooperation with an associated wind turbine 14 so as to provide for measuring atmospheric data 36 associated with the operation of the wind turbine 14, for example, a plurality of velocity, temperature or density measurements at a plurality of ranges R from the wind turbine 14, so as to provide for assessing both immediate and near term atmospheric conditions, the atmospheric data 36 of which can be used to control the wind turbine 14 so as to provide for optimizing the electrical power generated thereby or to prevent wind-caused damage thereto. For example, FIG. 16 illustrates a first embodiment for which the associated range imaging LIDAR system 24' is attached to the housing or nacelle 418 of the wind turbine 14, and FIG. 17 illustrates a second embodiment wherein the associated range imaging LIDAR system 24' is mounted within the housing or nacelle 418 of the wind turbine 14 and is operative from within or through a rotatable portion of the wind turbine 14, for example, from within or through a hollow axle of the wind turbine 14. For example, in both the first and second embodiments, the range imaging LIDAR system 24' comprises a plurality of beams of light 28.1, 28.2, 28.3 in a corresponding plurality of different directions, and a corresponding plurality of receive optics 32, 32.1, 32.2, 32.3 with a corresponding plurality of lines of sight 23.1', 23.2', 23.3' that in cooperation with the corresponding associated beams of light 28.1, 28.2, 28.3 provide for a plurality of associated interaction regions 17.1, 17.2, 17.3, each spanning a range of ranges R, and which collectively provide for measuring a different regions of the atmosphere 20. In the first and second embodiments illustrated in FIGS. 16 and 17, the associated range imaging LIDAR systems 24 are relatively fixed with respect to the wind turbine 14. Alternatively, the associated interaction regions 17.1, 17.2, 17.3 could be scanned within the atmosphere 20. For example, in the second embodiment of the range imaging LIDAR systems 24 illustrated in FIG. 17, the associated beams of light 28.1, 28.2, 28.3 and associated receive optics 32, 32.1, 32.2, 32.3 could be configured to rotate with the wind turbine 14 and thereby scan the associated interaction regions 17.1, 17.2, 17.3 over one or more conical surface paths. Alternatively or additionally, a ground-based LIDAR system 408 could be used in cooperation with the wind turbine 14 to similarly provide associated atmospheric data 36.

It should be understood that the range imaging LIDAR systems 24 can be used with any fluid medium that provides for generating detectable scattered light 30 when illuminated with a beam of line 28, including, but not limited to, non-atmospheric gases flowing in a pipe and liquids flowing in pipes, channels or sprays. For example, the range imaging LIDAR systems 24 could also be used to measure water flow in pipes or channels, or to provide for measuring the speed of a marine vehicle or the associated conditions of the water upon which or within which the marine vehicle operates.

Although the range imaging LIDAR systems 24', 24$^i$-24$^{viii}$ described herein have each incorporated a Fabry-Pérot interferometer 31, it should be understood that any type of interferometer could instead also be used, for example, including but not limited to either a Michelson interferometer and associated variations thereof, a Twyman-Green interferometer or a Fizeau interferometer.

Furthermore, although the range imaging LIDAR systems 24', 24$^i$-24$^{viii}$ described herein have been illustrated with associated geometries that provide for detecting backscattered scattered light 30, it should be understood that a range imaging LIDAR system 24', 24$^i$-24$^{viii}$ could also or alternatively incorporate an associated geometry that provides for detecting either transversely scattered light 30, or forward scattered light 30. Yet further, although the range imaging LIDAR systems 24', 24$^i$-24$^{viii}$ described herein have been illustrated as providing for range-responsive measurements responsive to a range R along the optic axis 23 of the receive optics 32, for example, a range R to the receive optics 32 or the detection system 34, the range-responsive measurements could also be characterized with respect to a range measured along the optic axis 25 of the beam of light 28, or any other axis, by geometric transformation.

The aforementioned U.S. patent application Ser. No. 11/460,603 filed on 27 Jul. 2006 that issued as U.S. Pat. No. 7,495,774 on 24 Feb. 2009, entitled Optical Air Data System, and International Application Serial No. PCT/US10/31965 filed on 21 Apr. 2010, entitled Atmospheric Measurement System, along with U.S. National Stage application Ser. No. 13/387,553 illustrates additional embodiments of LIDAR sensors 24 and associated platforms that may be incorporated in the atmospheric measurement system 10.

It should be appreciated that the various aspects and embodiments of the present invention as disclosed herein are merely illustrative of specific ways to make and use the invention and do not therefore limit the scope of the invention when taken into consideration with the appended claims and the following detailed description and the accompanying Figures. Features from one aspect and embodiment of the invention as disclosed herein can be combined with features from other aspects and embodiments of the invention.

Having thus described the present invention in detail, it is to be understood that the foregoing detailed description of the invention is not intended to limit the scope of the invention thereof. One of ordinary skill in the art would recognise other variants, modifications and alternatives in light of the foregoing discussion.

What is claimed is:

1. An apparatus that measures atmospheric conditions at least one of upstream and downstream of a position at which the apparatus is located; comprising:
    at least one substantially coherent energy source operatively connected to emit at least a first energy beam upstream of the apparatus position relative to a wind direction and a second energy beam downstream of the apparatus position relative to the wind direction;
    a first LIDAR sensor operatively connected to detect scattered energy from the first energy beam directed upstream of the apparatus position;
    a second LIDAR sensor operatively connected to detect scattered energy from the second energy beam directed downstream of the apparatus position;
    a processing circuit that generates data on the atmospheric conditions upstream and downstream of the apparatus position in response to the scattered energy detected by the first and second LIDAR sensors;
    a plurality of first LIDAR sensors operatively connected to detect scattered energy from the first energy beam directed upstream of the apparatus position; and a plurality of second LIDAR sensors operatively connected to detect scattered energy from the second energy beam directed downstream of the apparatus position, wherein the processing circuit is further configured to generate the data on the atmospheric conditions upstream and downstream of the apparatus position in response to the scattered energy detected by the pluralities of first and second LIDAR sensors.

2. An apparatus according to claim 1, wherein the at least one substantially coherent energy source is operatively connected to emit the first energy beam along a first plurality of lines of sight upstream of the apparatus position and the second energy beam along a second plurality of lines of sight downstream of the apparatus position, the plurality of first LIDAR sensors are operatively connected to detect the scattered energy from the first plurality of lines of sight of the first energy beam directed upstream of the apparatus position, the plurality of second LIDAR sensors are operatively connected to detect the scattered energy from the second plurality of lines of sight of the second energy beam directed downstream of the apparatus position, and the processing circuit is further configured to generate the data on the atmospheric conditions upstream and downstream of the apparatus position in response to the scattered energy detected by the pluralities of first and second LIDAR sensors in response to the pluralities of lines of sight.

3. An apparatus according to claim 1, wherein at last one of the plurality of first LIDAR sensors is mounted with the at least one coherent energy source, at least one of the plurality of second LIDAR sensors is mounted with the at least one coherent energy source, at least one other of the plurality of first LIDAR sensors is remotely located away from the at least one coherent energy source, and at least one other of the plurality of second LIDAR sensors is remotely located away from the at least one substantially coherent energy source.

4. A method for measuring atmospheric conditions upstream and downstream of a locatable position relative to a wind direction; comprising the steps of:

emitting at least a first substantially coherent energy beam upstream of the locatable position and a second energy beam downstream of the locatable position;

detecting scattered energy from the first substantially coherent energy beam directed upstream of the apparatus position via a first LIDAR sensor;

detecting scattered energy from the second substantially coherent energy beam directed downstream of the apparatus position via a second LIDAR sensor;

processing scattered energy data from the first and second LIDAR sensors;

generating data on the atmospheric conditions upstream and downstream of the locatable position in response to the scattered energy data from the first and second LIDAR sensors;

detecting the scattered energy from the first energy beam directed upstream of the locatable position via a plurality of first LIDAR sensors;

detecting the scattered energy from the second energy beam directed downstream of the locatable position via a plurality of second LIDAR sensors;

further processing scattered energy data from the pluralities of first and second LIDAR sensors; and generating data on the atmospheric conditions upstream and downstream of the apparatus position in response to the scattered energy data from the pluralities of first and second LIDAR sensors.

5. A method according to claim 4, further comprising:

emitting the first energy beam along a first plurality of lines of sight upstream of the locatable position and the second energy beam along a second plurality of lines of sight downstream of the locatable position;

detecting the scattered energy from the first plurality of lines of sight of the first energy beam directed upstream of the locatable position via the plurality of first LIDAR sensors;

detecting the scattered energy from the second plurality of lines of sight of the second energy beam directed downstream of the locatable position via the plurality of second LIDAR sensors;

further processing scattered energy data from the pluralities of first and second LIDAR sensors in response to the pluralities of lines of sight; and generating data on the atmospheric conditions upstream and downstream of the locatable position in response to the scattered energy data from the pluralities of first and second LIDAR sensors in response to the pluralities of lines of sight.

6. An apparatus that measures atmospheric conditions at least one of upstream and downstream of a position at which the apparatus is located; comprising:

at least one substantially coherent energy source operatively connected to emit at least a first energy beam upstream of the apparatus position relative to a wind direction and a second energy beam downstream of the apparatus position relative to the wind direction;

a first LIDAR sensor operatively connected to detect scattered energy from the first energy beam directed upstream of the apparatus position;

a second LIDAR sensor operatively connected to detect scattered energy from the second energy beam directed downstream of the apparatus position;

a processing circuit that generates data on the atmospheric conditions upstream and downstream of the apparatus position in response to the scattered energy detected by the first and second LIDAR sensors; and first and second substantially coherent energy sources, the first substantially coherent energy source being operatively connected to emit the first energy beam upstream of the apparatus position and the second coherent energy source being operatively connected to emit the second energy beam downstream of the apparatus position, wherein the first substantially coherent energy source is configured to emit an energy beam at a first wavelength in the range of at least one of short ultraviolet, long ultraviolet, infrared and visible, the second substantially coherent energy source is configured to emit an energy beam at a second wavelength in the range of at least one of short ultraviolet, long ultraviolet, infrared and visible, and the first wavelength is different from the second wavelength.

7. A method for measuring atmospheric conditions upstream of a locatable position relative to a wind direction; comprising the steps of:

emitting at least a first substantially coherent energy beam upstream of the locatable position;

detecting scattered energy from the first substantially coherent energy beam directed upstream of the apparatus position via a first LIDAR sensor that;

processing scattered energy data from the first LIDAR sensor using a Fabry-Perot interferometer; and generating data on the atmospheric conditions upstream of the locatable position in response to the scattered energy data from the first LIDAR sensor, wherein the step of generating the data on the atmospheric conditions includes generating data on at least aerosol and molecular components of the atmospheric conditions based on the equation $$I(\varphi) = C_A \psi_A\left(\varphi - 2M_0 \frac{u_A}{c}\right) + C_M \psi_M\left(\varphi - 2M_0 \frac{u_M}{c}, T\right),$$

where:
$C_A$ is the total aerosol signal intensity,
$\psi_A$ is the Fabry-Perot aerosol response,
$C_M$ is the total molecular intensity,
$\psi_M$ is the Fabry Perot molecular response,
$\varphi$ is the order,
T is the temperature,
$u_A$ is the aerosol velocity component
$u_M$ is the molecular velocity component, and
$M_0$ is the maximum order of the Fabry-Perot interferometer etalon.

\* \* \* \* \*